(12) United States Patent
Schleede

(10) Patent No.: US 12,077,186 B1
(45) Date of Patent: Sep. 3, 2024

(54) DYNAMIC THRESHOLD DETERMINATION FOR COLLISION AVOIDANCE

(71) Applicant: Zoox, Inc., Foster City, CA (US)

(72) Inventor: Peter Scott Schleede, Santa Clara, CA (US)

(73) Assignee: Zoox, Inc., Foster City, CA (US)

( * ) Notice: Subject to any disclaimer, the term of this patent is extended or adjusted under 35 U.S.C. 154(b) by 432 days.

(21) Appl. No.: 17/552,656

(22) Filed: Dec. 16, 2021

Related U.S. Application Data

(63) Continuation-in-part of application No. 17/463,096, filed on Aug. 31, 2021.

(51) Int. Cl.
*B60W 60/00* (2020.01)

(52) U.S. Cl.
CPC ..... *B60W 60/0016* (2020.02); *B60W 2554/20* (2020.02); *B60W 2554/40* (2020.02)

(58) Field of Classification Search
CPC ......... B60W 60/0016; B60W 2554/20; B60W 2554/40
See application file for complete search history.

(56) References Cited

U.S. PATENT DOCUMENTS

| | | | | |
|---|---|---|---|---|
| 2011/0077864 | A1* | 3/2011 | Konijnendijk | G01S 15/931 701/301 |
| 2019/0369616 | A1* | 12/2019 | Ostafew | H04L 67/12 |
| 2022/0410890 | A1* | 12/2022 | Takei | B60W 30/09 |
| 2023/0286536 | A1* | 9/2023 | Belman | G01C 21/3415 |

OTHER PUBLICATIONS

C. Guo, K. Kidono, R. Terashima and Y. Kojima, "Toward Human-like Behavior Generation in Urban Environment Based on Markov Decision Process With Hybrid Potential Maps," 2018 IEEE Intelligent Vehicles Symposium (IV), Changshu, China, 2018, pp. 2209-2215, doi: 10.1109/IVS.2018.8500439. (Year: 2018).*

F. Hecker, T. Luettel and H.-J. Wuensche, "Object related reactive offset maneuver," 2010 IEEE Intelligent Vehicles Symposium, La Jolla, CA, USA, 2010, pp. 1092-1097, doi: 10.1109/IVS.2010.5548068. (Year: 2010).*

(Continued)

*Primary Examiner* — Jelani A Smith
*Assistant Examiner* — Alyssa Rorie
(74) *Attorney, Agent, or Firm* — Lee & Hayes, P.C.

(57) ABSTRACT

Techniques for determining whether to yield a vehicle to an oncoming object based on a stationary object are discussed herein. A vehicle can determine a drivable area in an environment through which the vehicle is travelling. A trajectory associated with the vehicle can be determined. A probability that the oncoming object will intersect a drive path associated with a vehicle trajectory can be determined. In some case, the probability can be based on various distance metric(s) (e.g., dynamic distance metrics) of the environment. If the oncoming object is determined to intersect the drive path, a stopping location for the vehicle can be determined to allow the oncoming object to traverse around the stationary object. The vehicle can be controlled based on sensor data captured by the vehicle and the probability.

20 Claims, 9 Drawing Sheets

(56) References Cited

OTHER PUBLICATIONS

R. Reghelin and L. V. R. de Arruda, "Optimized fuel consumption trajectories of intelligent vehicles in a segment of road for any lane configuration," 2013 IEEE Intelligent Vehicles Symposium (IV), Gold Coast, QLD, Australia, 2013, pp. 876-881, doi: 10.1109/IVS.2013.6629577. (Year: 2013).*

Unnikrishnan H. et al., "Increasing traffic safety during single lane passing using wireless sensor networks," 2015 International Conference on Advances in Computing, Communications and Informatics (ICACCI), Kochi, India, 2015, pp. 2103-2107, doi: 10.1109/ICACCI.2015.7275927. (Year: 2015).*

\* cited by examiner

DYNAMIC THRESHOLD DETERMINATION FOR COLLISION AVOIDANCE

CROSS REFERENCE TO RELATED APPLICATION

This patent application is a continuation-in-part of U.S. patent application Ser. No. 17/463,096, filed Aug. 31, 2021. Application Ser. No. 17/463,096 is hereby incorporated by reference, in its entirety and for all purposes.

BACKGROUND

A vehicle can be controlled to avoid objects in an environment through which the vehicle is travelling. For example, systems can consider relative positions of stationary objects or moving objects with respect to the vehicle. However, determining actions of moving objects with respect to the vehicle is challenging and can lead to situations where movement of multiple objects is blocked.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
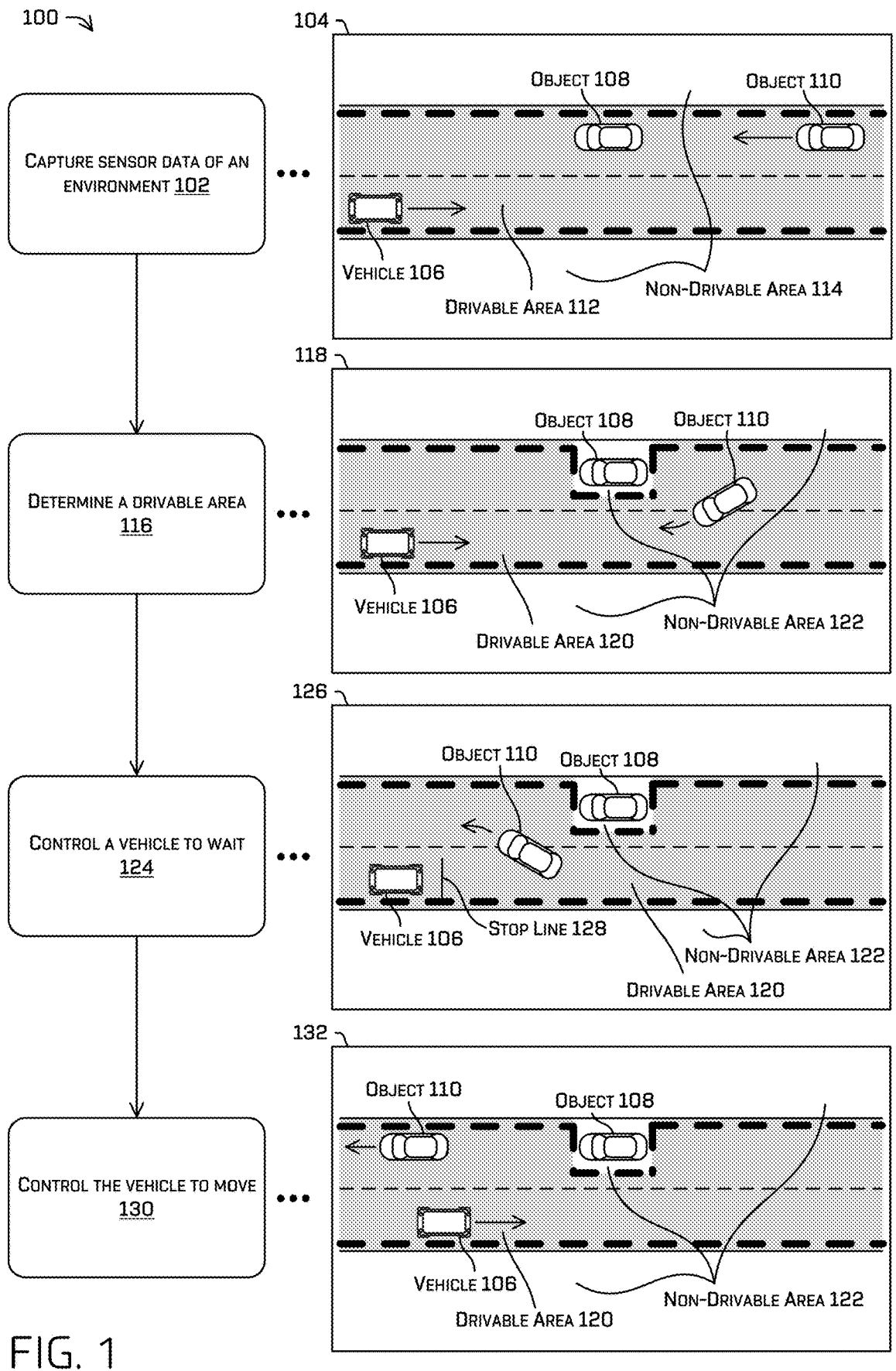
FIG. 1 is a pictorial flow diagram of an example process for determining how to control a vehicle approaching an object that may potentially maneuver around another object.

Techniques for determining how to control a vehicle approaching objects in an environment through which the vehicle is travelling are described herein. For example, the vehicle can determine whether it should navigate along trajectories based on whether there is an object (e.g., an oncoming vehicle) in an oncoming lane (also referred to herein as an "oncoming traffic lane") that may try to go around another object in the oncoming lane. Initially, the vehicle can determine whether there are objects in the oncoming traffic lane, and whether the objects are stationary or non-stationary. The vehicle can determine whether the objects are likely to be passed by the oncoming vehicle. The vehicle can consider a plurality of trajectories for traversing an environment. For a trajectory of the plurality, the vehicle can determine whether to stop to yield for an oncoming vehicle and if so, a location in the environment for the vehicle to stop to allow an oncoming vehicle to traverse around a stopped object in the environment.

For example, the vehicle can determine distance metrics that are utilized to determine whether to stop. The distance metrics can be distances between the trajectories of the vehicle and portions of the drivable area. The vehicle can determine whether to stop, further based on probabilities that the objects in the oncoming traffic lane will yield to the vehicle or attempt to pass the stationary objects. The vehicle can be controlled based on the distance metrics and the probabilities.

The vehicle can be controlled based on sensor data associated with the environment. The objects in the environment and/or attributes of the objects can be determined based on the sensor data. The objects and/or the attributes of the objects can be utilized to determine whether the objects in the environment are stationary vehicles and/or oncoming objects.

The vehicle can determine whether the objects in the environment are stationary by determining motion data of the objects and/or by using a machine learned (ML) model. The motion data of the objects can be compared to threshold motion. The objects can be determined to be stationary based on the motion of the objects being less than the threshold motion.

The vehicle can be controlled based on confidence levels of the stationary objects being in fixed positions and/or remaining in fixed positions. In some examples, the confidence levels can be output, via the signal, by the ML model.

In some examples, an object can be determined to be passing another object (stationary or not) in a variety of manners. For example, if a portion on an oncoming vehicle (e.g., a front bumper) passes the rear bumper of a stationary object, the oncoming object can be determined to be passing the object and to likely enter the lane of the vehicle. In another example, an oncoming object can be determined to be passing the stationary object if a distance metric between the oncoming object and a trajectory is below a threshold. In another example, the oncoming object can be determined to be passing a stationary object based on inputting data associated with the object (e.g., sensor data, prior states of the object, etc.) to a machine learned model.

If an object is determined to be an oncoming object, a vehicle can determine a stop location in the environment to safely stop to allow the oncoming object to traverse the environment. The stopping location can be based on characteristics of oncoming vehicle, buffer distances, and the like.

The techniques discussed herein can improve a functioning of a computing device in a number of additional ways. In some cases, determining whether object(s) (e.g., a vehicle) are stationary can simplify resources utilized to monitor the stationary object(s). The determination that the object(s) are stationary can enable resources that would otherwise be utilized to monitor potential movement of the stationary object(s) to be used for other purposes. In some cases, the drivable area determined based on the stationary object(s) can be utilized to more accurately predict movement of oncoming object(s) (e.g., an oncoming vehicle).

Resources that would be otherwise utilized to track and/or predict movement of the oncoming object(s) can be freed up and/or reallocated. For example, resources that are freed up can be reallocated for any other purpose such as controlling the vehicle, monitoring the environment through which the vehicle is travelling, or analyzing and/or storing data that is collected based on the monitoring.

Furthermore, the determination(s) of the stationary object(s) and the movement of the oncoming object(s) can enable the vehicle to determine one or more trajectory (ies) to safely and efficiently traverse the environment. For example, the resources that are freed up can be utilized to determine whether the oncoming object(s) are entering the lane of the vehicle. Movement of the oncoming object(s) can be determined and utilized to determine that the oncoming object(s) are entering the lane of the vehicle. The vehicle can safely stop to avoid the oncoming object(s) entering the lane. The vehicle can determine to stop at a particular location to allow that oncoming object(s) maneuver in the lane of the vehicle and then reenter the oncoming lane. The particular location at which the vehicle stops can enable the vehicle to avoid blocking the lane from the oncoming object(s). By controlling the vehicle to not block the oncoming object(s) from entering the lane and travelling in the lane of the vehicle, the oncoming object(s) can safely enter and leave the lane to pass the stationary object(s), This can prevent collisions and can improve overall flow of traffic. These and other improvements to the functioning of the computer are discussed herein.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configure to input data to determine movement associated with objects in an environment. Additionally, the techniques described herein can be used with real data (e.g., captured using sensor(s)), simulated data (e.g., generated by a simulator), or any third of the two.

FIG. 1 is a pictorial flow diagram of an example process 100 for determining how to control a vehicle approaching an object that may potentially maneuver around another object.

An operation 102 can include capturing sensor data. In some examples, the sensor data can be captured by one or more sensors on an autonomous vehicle. For example, the sensor data can include data captured by one or more of a lidar sensor, a radar sensor, an image sensor, a time of flight sensor, a sonar sensor, and the like. In some examples, the operation 102 can include receiving sensor data from a sensor associated with a vehicle.

In some examples, the operation 102 can include localizing the autonomous vehicle 106 in the environment and accessing map data associated with the environment. For example, map data can comprise map elements such as a crosswalk element (e.g., a region of the environment corresponding to a crosswalk), a lane element, a bike lane element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like.

An example 104 illustrates an environment in which a vehicle 106 (e.g., an autonomous vehicle) is traversing the environment (e.g., moving along a road). In some examples, the vehicle 106 can perform the operations of the process 100, which can include capturing or otherwise receiving the sensor data of the environment. For the purpose of discussion, a vehicle capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle are described throughout this disclosure.

The environment can also include one or more objects, including an object 108 (e.g., a vehicle) in a lane (e.g., an oncoming traffic lane) of the road on which the vehicle 106 is positioned. The lane including the object 108 can be associated with traffic (e.g., one or more vehicles) moving in a different (e.g., an opposite) direction than the vehicle 106. The lane in which the object 108 is positioned can be adjacent to a lane in which the vehicle 106 is positioned. The object 108 can be a stationary object, which can be determined based on the sensor data.

The environment can also include one or more additional objects, including an object 110 (e.g., a vehicle) in the oncoming traffic lane. The object 110 can be a moving object, which can be determined based on the sensor data.

Although the object 108 can be a vehicle as discussed above in this disclosure, it is not limited as such. The object(s), any of which can be represented by the object 108, can be a vehicle, a pedestrian, a bicycle, an animal, a tractor, a shipping container, a crate, a trailer, a narrow portion of the road constricting travel, and the like. Although the object 110 can be a vehicle as discussed above in this disclosure, it is not limited as such. The object(s), any of which can be represented by the object 108, can be a vehicle, a pedestrian, a bicycle, an animal, a tractor, and the like.

The environment can include a drivable area 112 (e.g., an area illustrated in FIG. 1 as a shaded area) and a non-drivable area 114 (e.g., an area illustrated in FIG. 1 as an unshaded area). The drivable area 112 can be associated with the road on which the vehicle 106 is positioned. A width of the drivable area 112 can be determined as a width of the road. The non-drivable area 114 can include any area in the environment, omitting the drivable area 112. The non-drivable area 114 can include any area that does not include the drivable area 112 (e.g., any and all areas (e.g., parking lane, curb, pavement, etc.) except for the road).

In some examples, the non-drivable area 114 can be determined based on the drivable area 112 (e.g., the non-drivable area 114 can be determined as any area of the environment excluding the drivable area 112). In other examples, the non-drivable area 114 can be determined separately (e.g., independently) from the drivable area 112. In those examples, the drivable area 112 can be determined as any of one or more areas associated with the road: and the non-drivable area 114 can be determined as any of one or more areas not associated with the road.

An operation 116 can include determining a drivable area. The drivable area can be determined based on the sensor data and/or the object 108. In some examples, the drivable area can be determined based on the sensor data and/or the object 108 being determined as stationary (e.g., a stationary object). In some examples, one or more portions of the road that are associated with corresponding stationary objects can be removed from the drivable area. In other examples, in a case in which the non-drivable area is determined independently from the drivable area, the drivable area can be determined as the portion(s) of the road, except for the portion(s) associated with the corresponding stationary objects.

An example 118 illustrates the environment with the object 110 approaching the object 108. The environment can include a drivable area 120, and a non-drivable area 122. The drivable area may include an area in which the vehicle 106 and the object 110 are travelling (e.g., an area of the road, excepting an area (e.g., the non-drivable area 122) associated with the object 108). The object 108 can be stationary. The vehicle 106 and the object 110 can be moving (e.g., travelling in opposite directions) along the road. As the object 110 gets near the object 108, the object 110 may veer out of its lane. The object 110 may turn and maneuver to a different portion of the lane and/or a different lane. The object 110 may enter at least a part of a lane in which the vehicle 106 is travelling in order for the object 110 to pass the object 108 (e.g., an oncoming lane from the perspective of object 110). The vehicle 106 can determine whether the object 110, which is moving in an opposite direction of the vehicle 106, veers toward the vehicle 106 and/or enters any portion of the lane of the vehicle 106.

In some examples, the drivable area 120 can be determined based on the drivable area 112, by removing (e.g., omitting) an area associated with the object 108. In those examples, the drivable area 120 can be determined as a modified drivable area, based on the drivable area 112. In some examples, the drivable area 120 can be determined based at least in part on map data and/or sensor data of the environment. Examples of determining a drivable area (e.g., a drive envelope) based on one or more objects (e.g., agents) and/or predicted actions of the object(s) are discussed in, for example, U.S. patent application Ser. No. 15/982,694 titled "Drive Envelope Determination:" and filed May 17, 2018, which is incorporated by reference herein in its entirety for all purposes.

An operation 124 can include controlling the vehicle 106 to wait (e.g., yield) based on the object 108 and the object 110. The vehicle 106 can be controlled to wait based on an area in front of the vehicle 106 being large enough for the object 110 to maneuver back into the oncoming lane. The vehicle 106 can determine the area in front of the vehicle 106 that is large enough for the object 110 to maneuver back into its lane after passing the object 108. The vehicle 106 can determine the area is large enough for the object 110 to maneuver back into its lane by travelling between the vehicle 106 and the object 108 (e.g., between the vehicle 106 and a portion of the non-drivable area 122 that includes the object 108).

An example 126 illustrates the environment in which the object 110 is maneuvering into the lane (e.g., oncoming lane) of traffic flowing in the direction of object 110. The vehicle 106 can be controlled to wait based on a stop line 128 (e.g., as determined further according to the techniques discussed below with respect to FIGS. 2A and 2B). The vehicle 106 can wait, based on the vehicle 106 being controlled to stop at the stop line 128 (e.g., a location associated with the road) (also referred to herein as a "stopping location"). The stop line 128 can be determined to enable the vehicle 106 to provide sufficient space (e.g., clearance) for the object 110 to maneuver around the object 108. The location of the stop line 128 can be determined based on the vehicle 106 being stopped at a position to provide an area (e.g., an area between the vehicle 106 and the object 108) that is large enough for the object 110 to maneuver back into the oncoming lane. The object 110 may return to its lane after passing the object 108. The vehicle 106 can determine whether the object 110 is maneuvering to return to (e.g., re-enter) the oncoming lane before beginning to move again.

In some examples, additionally or alternatively to the determining of the location of the stop line 128, as discussed above, the location of the stop line 128 can be determined further based on one or more of a safety determination (e.g., a determination of how soon to stop the vehicle 106 to ensure safety of the occupants), a reference trajectory (e.g., an initial trajectory) determined for the vehicle 106, and a progress determination (e.g., a determination of a change in one or more of a location, a speed, an acceleration, etc.) of the vehicle 106. The location of the stop line 128 can be determined in any order with respect to controlling the vehicle 106 to stop (e.g., the location can be determined before the vehicle 106 begins to slow down to stop or after the vehicle begins to slow down to stop).

An operation 130 can include controlling the vehicle 106 to move. The vehicle 106 can be controlled to move based on the object 110 having returned to the oncoming lane.

An example 132 illustrates the vehicle 106 moving after having been stopped at the stop line 128. The vehicle 106 can move in a direction that is opposite to the direction in which the object 110 is moving. The vehicle 106 can move in a lane adjacent to the oncoming lane. The vehicle 106 can move to a position adjacent to the object 108 and the non-drivable area 122. The vehicle 106 can continue moving past the position adjacent to the object 108 and the non-drivable area 122.

The examples 104, 118, 126, and 132 can represent the environment over time. For example, the example 104 can represent the environment at time $T_1$, the example 118 can represent the environment at time $T_2$, the example 126 can represent the environment at time $T_3$, and the example 132 can represent the environment at time $T_4$. Of course, the examples 104, 118, 126, and 132 can represent the environment at any period in time and are not limited to any express examples discussed herein.

Figure 2A:
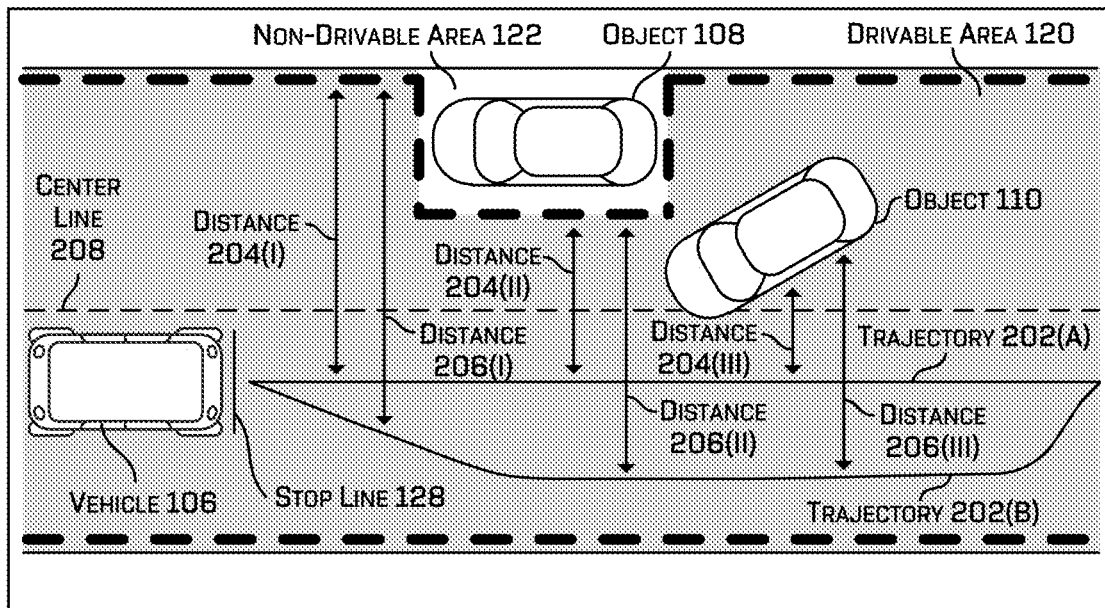
FIGS. 2A and 2B illustrate examples of an environment including a vehicle approaching an object that may potentially maneuver around another object.
Figure 2B:
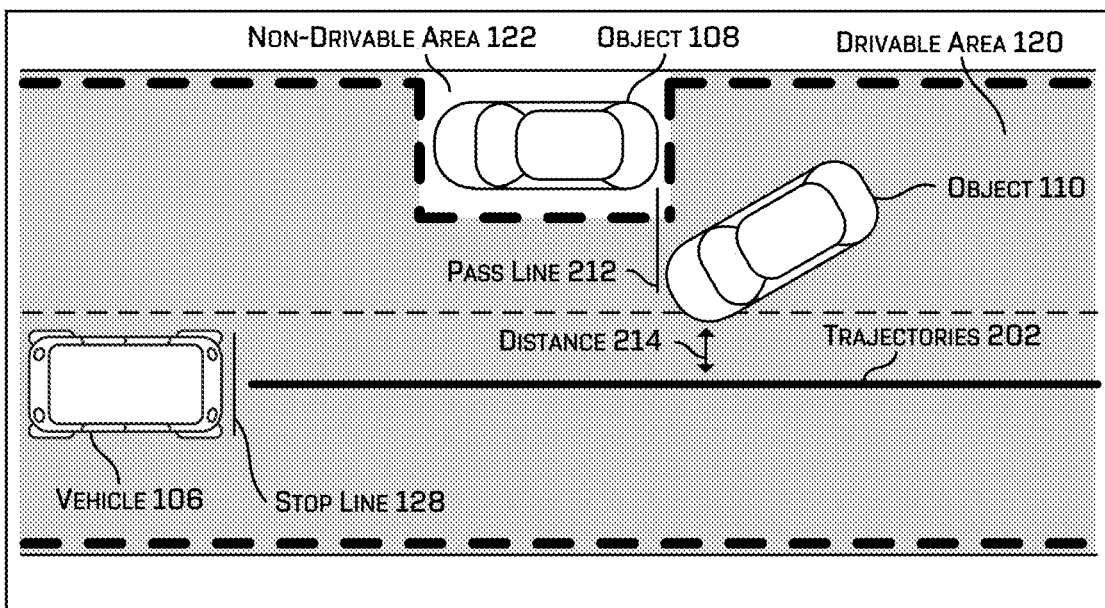

FIGS. 2A and 2B illustrate examples of an environment including a vehicle approaching an object that may potentially maneuver around another object. FIG. 2A illustrates evaluating the environment with respect to a drivable area, objects, and trajectories, to determine whether there is room for vehicle to safely navigate and possibly where to stop in an environment.

As illustrated in FIG. 2A, an example 200 can include the vehicle 106 travelling in a lane of a road in the environment. The vehicle 106 can travel in a direction toward a portion of the lane that is adjacent to the object 108, around which another object (e.g., the object 110) may potentially maneuver. The vehicle 106 can determine the drivable area 120 and the non-drivable area 122.

The vehicle 106 can determine trajectories 202(A) and 202(B) (collectively referred to herein as trajectories 202). The trajectories 202 can be determined in response to map data, object information, and/or routing requests for the vehicle 106. The trajectories 202 can be utilized to determine how the vehicle 106 may be controlled as it travels on the road. Such trajectories 202 may be determined based at least in part on the drivable surface, as well as additional data about the objects in the environment proximate the vehicle to determine a trajectory for navigating safely past the objects 108 and 110.

The vehicle 106 can utilize a center line 208 as guidance for the trajectories 202. The trajectories 202 can follow a curvature of the road (e.g., be straight, based on the road being straight). The trajectories 202 can veer (e.g., turn) from following the road curvature for controlling the vehicle 106 to travel around the object 108. The center line 208 can be utilized as guidance for the trajectories 202 to return to following a curvature of the road (e.g., to being straight), after passing the object 108. Examples of determining trajectories of a vehicle are discussed in, for example, U.S. patent application Ser. No. 15/843,512 titled "Trajectory Generation Using Curvature Segments:" and filed Dec. 15, 2017, which is incorporated by reference herein in its entirety for all purposes The vehicle 106 can determine an action independently with respect to each trajectory 202(A) and 202(B). For example, various distance metrics can be determined with respect to the trajectories 202(A) and 202(B). In some examples, the distances can include distances 204(I)-204(III) (e.g., first distances) (collectively referred to as distances 204) associated with the trajectory 202(A), and distances 206(I)-206(III) (e.g., second distances) (collectively referred to as distances 206) associated with the trajectory 202(B).

The distances 204 and the distances 206 can be utilized to evaluate a portion of the drivable area 120, through which the vehicle 106 may navigate. By way of example, each of the distances 204 can be measured between a point (e.g., a first point) on the trajectory 202(A) and a point (e.g., a second point) in a portion (e.g., an edge) of the drivable area 120 or any of the object(s) (e.g., the object 108, the object 110, etc.) in the drivable area 120. The second point may be aligned with the first point, in a lateral direction.

The distances 204 can be used to evaluate if the vehicle 106 should stop or yield in an environment, and if so, where the vehicle 106 should stop. Further, costs for each trajectory 202(A) 202(B) can be determined, and a trajectory can be selected based on costs. The vehicle 106 can stop at a position (e.g., the stop line 128, as discussed above with reference to FIG. 1). In some examples, the position at which the vehicle 106 determines to stop for any of the respective trajectories 202 may be different from one or more positions at which the vehicle 106 determines to stop for other corresponding trajectories 202. In some examples, a stop location can be determined based on the width of the object plus some buffer distance. In some examples, the stop location can be determined based on the distances 204(II) or 206(II). That is, the stop location can be based on the distance between a trajectory and the obstacle (e.g., the object 108) in the environment.

By way of example and without limitation, processing may determine, for the trajectory 202(A), that there is not enough room for the object 110 to traverse around the object 108 (e.g., the distance 204(II) is below a threshold), in which case, the trajectory 202(A) can be associated with the stop line 128. In some examples, the threshold can be based on a width of the object 110 and a buffer distance. In some examples, the trajectory 202(B) can provide enough room for the object 110 to traverse around the object 108, in which case processing may determine that stopping may not be needed for the trajectory 202(B). Because the trajectory 202(B) may make more progress than the trajectory 202(A), a progress cost for the trajectory 202(A) may be higher than a progress cost for the trajectory 202(B). A trajectory can be selected or otherwise determined based on this cost and other costs. For example, other costs can include, but are not limited to, reference cost(s) (e.g., deviating from a reference trajectory), acceleration cost(s), steering cost(s), lane change cost(s), obstacle cost(s), comfort cost(s), and the like.

In some examples, the vehicle 106 can determine any of one or more of a subset of the distances (e.g., the distances 204) as a distance metric (e.g., a trajectory distance metric) (e.g., a first distance metric). The trajectory distance metric can be, for example, a distance between a point of the trajectory 202A and a point of the drivable area 120 or one of the stationary objects (e.g., the object 108) that is shorter than each of the other distances in the subset (e.g., the subset can include any of the distances 204 associated with the drivable are 120 and the object 108). In those examples, the vehicle 106 can determine a distance (e.g., a side-to-side distance (e.g., a width)) of the object 110 as a distance metric (e.g., an object distance metric) (e.g., a second distance metric).

In some examples, the object distance metric can be determined as a combination (e.g., a sum) of an extent (e.g., a width and/or a length) of the object 110 and a buffer distance (also referred to herein as a "buffer") (e.g., the buffer distance can be used to effectively enlarge the extent (e.g., the width and/or the length) of the object 110 used to determine the object distance metric). For purposes of this discussion, the object distance metric may be referred to, and utilized in any techniques throughout this disclosure, as a metric that collectively includes the width and/or length of the object 110 and the buffer distance (e.g., a sum of the width and/or length of the object 110 and the buffer distance). Alternatively, the object distance metric can include the width and/or length of the object 110, with the buffer distance being referred to, and utilized in any techniques throughout this disclosure, as a distance that is not included as part of the second distance.

The buffer distance can be determined as a safety factor. By way of example, the determination metric of the buffer distance may be a safety determination. The buffer distance (e.g., ¼ meter (m), ½ m, 1 m, 3 m, etc.) can be determined based on motion data (e.g., kinematics and/or dynamics) of the object 110 and/or the vehicle 106. The motion data can include various types of data such as a velocity, an expected turning radius, etc. The vehicle 106 can be controlled to move (e.g., slow down, change positions in a lane, change lanes, stop, etc.) differently based on the buffer distance. In some examples, the buffer distance can be determined based on whether the object 110 is a relatively larger object (e.g., a semi-truck), or a relatively smaller object (e.g., a sedan). For instance, in an example with the object 110 being the semi-truck, the vehicle 106 can determine that the semi-truck will be unable to pass by the object 110 if the vehicle 106 does not stop at the stop line 128. The vehicle 106 can determine based on the buffer distance being larger for the semi-truck than for the sedan, that the semi-truck will be blocked from passing the object 108 unless the vehicle 106 stops at the stop line 128.

The buffer distance can be determined further based on a trajectory of the object 110. Examples of determining trajectories of an object in an environment of a vehicle are discussed in, for example, U.S. patent application Ser. No. 16/420,050 titled "Trajectory Prediction On Top-Down Scenes and Associated Model:" and filed May 22, 2019, which is incorporated by reference herein in its entirety for all purposes.

In another example with the object 110 being the sedan, the vehicle 106 can determine that the sedan will be able to pass by the object 110 even if the vehicle 106 does not stop at the stop line 128. The vehicle 106 can determine based on the buffer distance being smaller for the sedan than for the semi-truck, that the sedan will not be blocked from passing the object 110 even if the vehicle 106 continues along one or more of the trajectories 202. In other instances, for example with the vehicle 106 still needing to stop to allow the sedan to pass the object 110 and return to the oncoming traffic lane, the vehicle 106 can determine the stop line 128 to be further from the vehicle 106 for the object 110 being the sedan than for the object 110 being the semi-truck. This, similar to the example above with the vehicle 106 not needing to stop, may be due to the sedan needing less room between the vehicle 106 and the object 110 to be able to pass the object 110 and return to the oncoming traffic lane.

The vehicle 106 can be controlled to move (e.g., slow down, change positions in a lane, change lanes, stop, etc.) based on the trajectory distance metric being less than the object distance metric associated with the object 110. In some examples, the stop line 128 can be determined based on the trajectory distance metric and the object distance metric (e.g., the trajectory distance metric being less than the object distance metric). In those examples, the stop line 128 determined based on the first distance being less than the object distance metric can be utilized for the controlling of the vehicle 106. In those examples, the vehicle 106 can stop at the stop line 128 to allow the object 110 to pass by the object 108. The vehicle 106 can be controlled to move after the lane is clear, based on the object 110 returning to the oncoming traffic lane.

In other examples, the vehicle 106 can be controlled to move (e.g., speed up, continue moving at a same speed, slow down, change positions in a lane, change lanes, etc.) based on the trajectory distance metric meeting or exceeding the object distance metric associated with the object 110. In those examples, the vehicle 106 may not have to slow down, and may be able to continue moving along the trajectory 202(A) at a same speed, or even a faster speed, based on the trajectory distance metric meeting or exceeding the object distance metric. This may be due to there being no (or low) safety risk of the vehicle 106 and the object 110 colliding or moving too close to one another. This may include, or may not include, the vehicle 106 veering away from the object 110 within the same lane or to a different lane.

A trajectory that is safer and/or results in more efficient progress toward the goal can have a lower cost than a trajectory that is less safe and/or results in less efficient progress toward the goal. The trajectory with the lower/lowest cost among the trajectories 202 can be utilized to control the vehicle 106. In some examples, more than one of the trajectories 202 can be utilized to control the vehicle 106. Any of the trajectories 202 (e.g., a target trajectory) can be utilized at any time to replace a current one of the trajectories 202 based on the corresponding costs changing in favor of the target trajectory. In those examples, previously determined trajectories can be modified, and new and/or different trajectories can be continually determined. The modified, new, and/or different trajectories can be analyzed, updated, and/or replaced in real-time or near real-time based on the corresponding costs as the vehicle 106 travels on the road. Examples of evaluating trajectories of vehicles and objects to avoid collisions are discussed in, for example, U.S. patent application Ser. No. 17/086,047 titled "Collision Avoidance Algorithm:" and filed Oct. 30, 2020, which is incorporated by reference herein in its entirety for all purposes.

FIG. 2B illustrates different techniques for determining whether an object is an oncoming object to which the vehicle 106 should yield. As illustrated in FIG. 2B, an example 210 can include the vehicle (e.g., the vehicle 106) and the objects (e.g., the object 108 and the object 110) in the environment, as discussed above in the example 200 with reference to FIG. 2A. The vehicle 106 can determine one or more of the trajectories 202 (shown collectively as the trajectory 202, pictorialized with a thicker line, for simplicity). In some examples, the trajectories 202 can include an initial trajectory (e.g., a reference trajectory (e.g., the trajectory 202(A))) utilized to control the vehicle 106.

In some examples, the vehicle 106 can determine that the object 110 passing the object 108 is an oncoming object in the lane of the vehicle 106. In some examples, the determination can be made in a number of ways. For example, the vehicle 106 can determine one or more of i) corresponding locations of the object 110 and the object 108, ii) a distance between the object 110 and the trajectories 202, iii) one or more metrics associated with the object 110, and/or iv) a signal from a machine learned (ML) model.

The corresponding locations of the object 110 and the object 108 can be utilized to determine that a portion of the object 110 is closer to the vehicle 106 than a portion the object 108 (e.g., the portion of the object 108 is further from the vehicle 106 than the portion of the object 110). The portion of the object 110 can include any type of portion (e.g., a front bumper at a side of the object 110 toward which oncoming traffic is moving, a front edge of a hood, etc.). The portion of the object 108 can include any type of portion (e.g., a bumper (e.g., a rear bumper at a side of the object 108 opposite from the side toward which oncoming traffic is moving, a rear edge of a hood, etc.). By way of example, the front bumper of the object 110 being closer to the vehicle 106 than the rear bumper of the object 108 can be utilized to determine that the object 110 passing the object 108 is an oncoming object in the lane of the vehicle 106. In some examples, the portion of the object 110 being at a same distance from the vehicle 106 as the portion of the object 108 can be associated with both of the portion of the object 110 and the portion of the object 108 being at a pass line 212. In some examples, the pass line 212 may be tangent to the second portion (e.g., the bumper) of the object 108. The pass line 212 may extend at an angle or extend laterally, with respect to an edge of the road.

The distance between the object 110 and the trajectories 202 can be determined as a distance 214 between a portion of the object 110 and a portion of the trajectories 202. In some examples, the determining of the distance between the object 110 and the trajectories 202 can include determining the distance 214 between the portion (e.g., a point) of the object 110 and a portion (e.g., a point) of the trajectories 202 (e.g., a corresponding one of the trajectories 202). The distance 214 being less than a threshold distance can be utilized to determine that the object 110 passing the object 108 is an oncoming object in the lane of the vehicle 106.

The one or more metrics can include metric(s) (e.g., attribute(s)) associated with any of one or more of the objects (e.g., the object 108, the object 110, etc.) in the environment. Any of the metric(s) being satisfied can be utilized to determine that the object 110 passing the object 108 is an oncoming object in the lane of the vehicle 106. The metric(s) of any of the object(s) in the environment can include different types of metrics, such as a state of a turn signal (e.g., a lighting signal indicator), one or more orientations and/or one or more speeds of corresponding tires, a distance, a pose, a motion (e.g., speed (e.g., a velocity)), a lane change, etc. In some examples, the metric(s) can include a state of a turn signal of the object 108 (e.g., an activated state of a right turn signal at a side of the object 108 toward an edge of the road at which oncoming vehicles can park). In some examples, the metric(s) can include a state of a turn signal of the object 110 (e.g., an activate state of a left turn signal at a side of the object 110 opposite the edge of the road at which oncoming vehicles can park). In some examples, the metric(s) can include an orientation and/or an angle of corresponding ones of a plurality of tires of the object 108. In some examples, the metric(s) can include an orientation and/or an angle of corresponding ones of a plurality of tires of the object 110.

In some examples, the metric(s) can include a distance (e.g., a width and/or length) of the object 108 meeting or exceeding a threshold distance. In some examples, the metric(s) can include a distance (e.g., a width and/or length distance of the object 110, or a combined distance (e.g. a sum) of a side-to-side distance of the object 110 and a buffer distance) meeting or exceeding a threshold distance. The distance metric for the object 110 can be the same as, or different from, the distance metric (e.g., the object distance metric discussed above with reference to FIG. 2A). In some examples, the metric(s) can include a pose of the object 108 that includes a longitudinal line passing through the object 108 being parallel with respect to a line tangent to an edge of the road. In some examples, the metric(s) can include a pose of the object 108 that includes a longitudinal line passing through the object 108 being angled with respect to a line tangent to an edge of the road such that a front portion of the object 110 (e.g., a portion at a side of the object 110 toward which oncoming traffic is moving) is further from an edge of the road along which the oncoming traffic can park than a rear portion of the object 110 (e.g., a portion at an opposite side of the object 110). In some examples, the metric(s) can include a speed of the object 108 being less than a threshold speed. In some examples, the metric(s) can include a speed of the object 110 meeting or exceeding a threshold speed. In some examples, the metric(s) can include a lane change of the object 108, in a case in which the object 108 is not stationary. In some examples, the metric(s) can include a lane change of the object 110, in a case in which the object 108 is not stationary.

The metric(s) can be used to disambiguate between objects (e.g., the object 110) that are moving, objects in traffic that are temporarily stopped (e.g., an object at a traffic light), and objects (e.g., the object 108, double parked objects, etc.) that are stationary. Examples of controlling a vehicle based on stationary vehicles that are double-parked are discussed in, for example, U.S. patent application Ser. No. 15/897,028 titled "Detecting Blocking Objects:" and filed Sep. 28, 2018, which is incorporated by reference herein in its entirety for all purposes.

In various examples, the determination of the metric(s) can be utilized to determine, and/or compensate for, measurement errors in the sensors and/or perception/prediction systems into account. By way of example, the motion of the object 108 can be compared to the threshold motion (e.g., $1/16$ meters per second (m/s), $1/4$ m/s, 1 m/s, etc.) to determine whether the object 108 is stationary. In those examples, at least some of the motion of the object 108 may be due to noise associated with the sensor data. In some examples, the object 108 can be determined to be stationary based on the motion of the object 108 being less than the threshold motion.

In some examples, the ML model can output the signal based on one or more of any of the ways, discussed above, of determining that the object 110 is an oncoming object in the lane of the vehicle 106. The ML model can output one or more confidence levels. The confidence level(s) and indicate whether the object 108 is in motion and/or will stay in motion.

In some examples, determining the object 110 passing the object 108 can be a binary determination or a probability. The vehicle 106 can be controlled based on the binary determination (e.g., a positive binary determination) indicating the object 110 passing the object 108, or the probability meeting or exceeding a threshold probability (e.g., a first threshold probability). In some examples, determining that the binary is positive (e.g., indicative of the object 110 passing the object 108) or the probability meets or exceeds the threshold probability can be associated with a likelihood that the object 110 will intersect the trajectories 202.

In some examples, the determining of the object 110 passing the object 108 can include determining a lane change flag or a probability of a lane change being performed by the object 110 (e.g., a probability of the object 110 not yielding to the vehicle 106). The lane change flag and/or the probability of the lane change being performed can be determined based on one or more of any of the ways, discusses above, that can be utilized to determine the object 110 passing the object 108. The determining of the lane change flag being set as "true" or the probability meeting or exceeding the threshold probability can indicate a likelihood that the object 110 will intersect the trajectories 202 (e.g., whether the object 110 is moving in a direction (e.g., a lateral direction) toward the trajectories 202) (e.g., whether the object 110 will veer toward the lane of the vehicle 106, or out (e.g. partially or completely) of the oncoming traffic lane, to go around/pass the object 108, such as to avoid a collision with the object 108). The determining of the lane change flag being set as "false" or the probability being less than the threshold probability can indicate that the object 110 will not likely intersect the trajectories 202.

In some examples, a likelihood of an intersection between the vehicle 106 and the object 110 can be determined based on the determination of the object 110 passing the object 108. In those examples, the determining of the likelihood of the intersection can include determining a likelihood of the object 110 overlapping (e.g., partially or entirely overlapping) with the vehicle 106 at a point in time. Examples of determining a likelihood of collision between a vehicle and an object are discussed in, for example, U.S. patent application Ser. No. 17/086,047 titled "Collision Avoidance Planning System:" and filed Oct. 30, 2020, which is incorporated by reference herein in its entirety for all purposes.

In some examples, the vehicle 106 can be controlled based on the determining of the object 110 passing the object 108 and or the determining of the likelihood of an intersection between the vehicle 106 and the object 110. In those examples, the vehicle 106 can be controlled to modify a movement (e.g., one or more of changing positions in a lane of the vehicle 106 (e.g., moving the vehicle 106 away from the oncoming traffic lane), changing lanes, slowing down, stopping, etc.). The controlling of the vehicle 106 to stop can include controlling the vehicle 106 to stop at the stop line 128, as discussed herein. The modifying of the movement of the vehicle 106 can include, as part of, or in addition to, changing from one of the trajectories 202 (e.g., the reference trajectory) to one or more other ones of the trajectories 202.

Techniques discussed throughout this disclosure that utilize the determination of the object 110 passing the object 108 can be performed in a similar way based on whether the object 108 is stationary or not stationary. For example, the movement of the vehicle 106 can be modified based on determining the object 108 is travelling in the oncoming traffic lane and likely to be passed by the object 110. In such instances, the determination of the object 110 passing the object 108 can be utilized to modify a movement (e.g., one or more of changing positions in a lane of the vehicle 106, changing lanes, slowing down, stopping, etc.) of the vehicle 106.

In some examples, the vehicle 106 can determine and utilize a drive path associated with the corresponding one of the trajectories 202. In some examples, the drive path may be tangent to the corresponding one of the trajectories 202. The drive path may indicate possible positions of a portion (e.g., a wheel, a turn signal indicator, a headlight, etc.) of the vehicle 106 as it travels along the trajectories 202. The likelihood that the object 110 will intersect the drive path can be utilized in any of the functions discussed through this disclosure, alternatively, or additionally, to the likelihood that the object 110 will intersect the trajectories 202.

Although techniques for determining whether an object is an oncoming object to which the vehicle 106 should yield as discussed above with reference to FIG. 2B can be implemented separately from techniques for utilizing the stop line 128, the distances 204, and/or the distances 206 to control the vehicle 106 as discussed above with reference to FIG. 2A in the disclosure herein, it is not limited as such. Any of the techniques for determining whether an object is an oncoming object to which the vehicle 106 should yield as discussed above with reference to FIG. 2B can be implemented in any way along with any of the techniques for utilizing the stop line 128, the distances 204, and/or the distances 206 to control the vehicle 106 as discussed above with reference to FIG. 2A. By way of example, the determination of the object 110 passing the object 108 can be utilized to control the vehicle 106 to modify the movement, based on the stop line 128 that is determined based on the trajectory distance metric and the object distance metric.

Figure 3A:
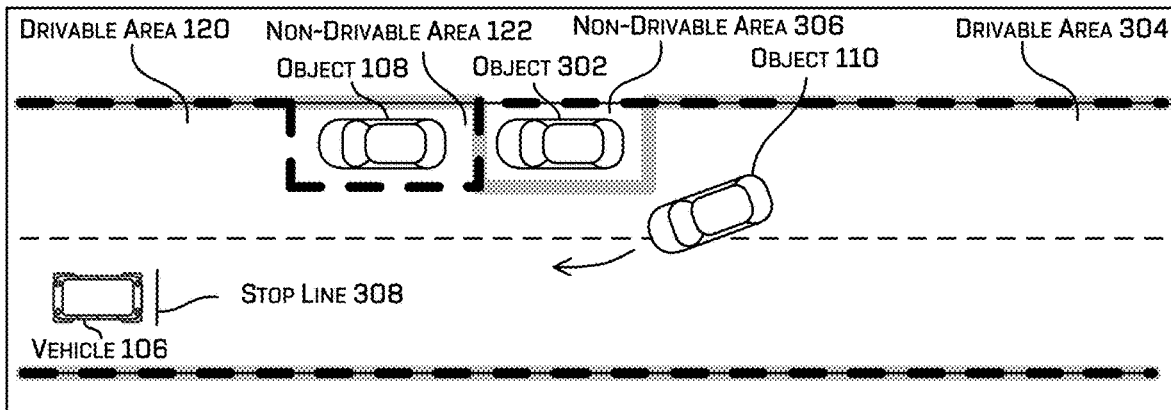
FIGS. 3A-3C are illustrations showing a vehicle approaching an object that may potentially maneuver around one or more other objects.
Figure 3B:
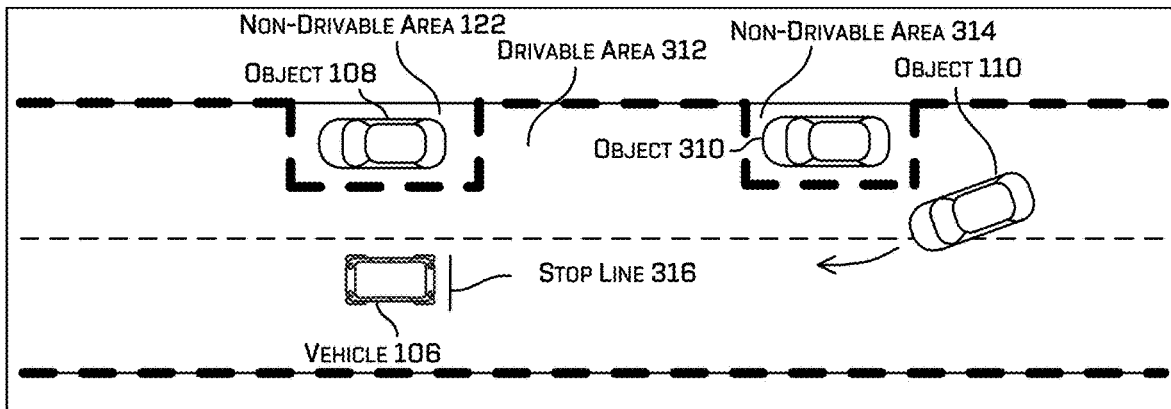
Figure 3C:
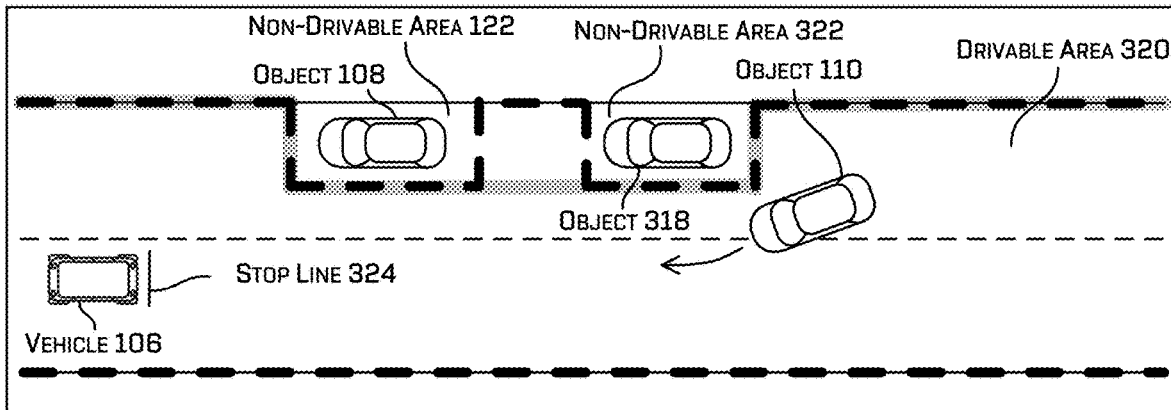

FIGS. 3A-3C are illustrations showing a vehicle approaching an object that may potentially maneuver around one or more other objects.

Referring to FIG. 3A, the vehicle 106 can determine an object 302 is stationary and/or determine (e.g., mark) the object 302 as an obstruction in a similar way as for the object 108, as discussed above with reference to FIG. 2. The vehicle 106 can determine a drivable area 304 (shown as an area outlined with a solid line) in a similar way as for the drivable area 120 (shown as an area outlined with a hatched line), as discussed above with reference to FIGS. 1-2B. The vehicle 106 can determine a non-drivable area 306 in a similar way as for the non-drivable area 122, as discussed above with reference to FIGS. 1-2B.

The vehicle 106 can fuse together the drivable area 120 and the drivable area 304 into a fused drivable area. The vehicle 106 can fuse together the non-drivable area 122 and the non-drivable area 306 as a fused non-drivable area. The vehicle 106 can determine whether to stop, and determine a stop line 308, in a similar way as for the stop line 128 as discussed above with reference to FIGS. 1-2B. The determination of the stop line 128 can be based on the fused drivable area and the fused non-drivable area, in a similar way as for the drivable area 120 and the non-drivable area 122, as discussed above with reference to FIGS. 1-2B.

By fusing together the drivable areas (e.g., the drivable area 120 and the drivable area 304) and the non-drivable areas (e.g., the non-drivable area 122 and the non-drivable area 306), the vehicle 106 can conserver computational power. The determination of the stop line 128 is also more accurate based on the fused drivable area and the fused non-drivable area, since they incorporate information associated with both the object 108 and the object 302.

Referring to FIG. 3B, the vehicle 106 can determine an object 310 is stationary and/or determine (e.g., mark) the object 310 as an obstruction in a similar way as for the object 108, as discussed above with reference to FIG. 2B. The vehicle 106 can determine a drivable area 312 in a similar way as for the drivable area 120, as discussed above with reference to FIGS. 1-2B. The vehicle 106 can determine a non-drivable area 314 in a similar way as for the non-drivable area 122, as discussed above with reference to FIGS. 1-2B.

The vehicle 106 can determine the drivable area 312 with the non-drivable area 122 and the non-drivable area 314. The vehicle 106 can determine whether to stop, and determine a stop line 316, in a similar way as for the stop line 128 as discussed above with reference to FIGS. 1-2B. The determination of the stop line 316 can be based on the drivable area 312 and the non-drivable area 314, in a similar way as for the stop line 128 determined based on the drivable area 120 and the non-drivable area 122, as discussed above with reference to FIGS. 1-2B.

Because the vehicle 106 can be controlled based on the stop line 316 associated with the object 310 instead of the stop line 128 associated with the object 108, the vehicle 106 does not have to determine whether to stop based on the object 108. The vehicle 106 can conserve processing and memory resources by not determining whether to stop for the object 108 and/or the stop line 128.

Referring to FIG. 3C, the vehicle 106 can determine an object 318 is stationary and/or determine (e.g., mark) the object 318 as an obstruction in a similar way as for the object 108, as discussed above with reference to FIG. 2B. The vehicle 106 can determine a drivable area 320 (shown as an area outlined with a hatched line) in a similar way as for the drivable area 120, as discussed above with reference to FIGS. 1-2B, except based on two stationary objects (e.g., the object 108 and the object 318). The vehicle 106 can determine a non-drivable area 322 in a similar way as for the non-drivable area 122, as discussed above with reference to FIGS. 1-2B.

The vehicle 106 can modify the drivable area 320 (shown as an area outlined with a solid line), based on the non-drivable area 122 and the non-drivable area 322. The non-drivable area 122 and the non-drivable area 322 can be fused into a fused drivable area. The vehicle 106 can determine whether to stop, and determine a stop line 324, in a similar way as for the stop line 128 as discussed above with reference to FIGS. 1-2B. The determination of the stop line 324 can be based on the drivable area 320 and the fused non-drivable area, in a similar way as for the stop line 128 determined based on the drivable area 120 and the non-drivable area 122, as discussed above with reference to FIGS. 1-2B.

The vehicle 106 can determine whether to fuse together the non-drivable area 122 and the non-drivable area 322, but to not fuse together the non-drivable area 122 and the non-drivable area 314. The determination to fuse together the non-drivable area 122 and the non-drivable area 322 can be based on a distance between the non-drivable area 122 and the non-drivable area 322 being less than a combination of an end-to-end distance of the object 310 and a buffer distance. The determination to not fuse together the non-drivable area 122 and the non-drivable area 314 can be based on a distance between the non-drivable area 122 and the non-drivable area 322 meeting or exceeding a combination of the end-to-end distance of the object 310 and the buffer distance.

By fusing together the non-drivable area 122 and the non-drivable area 322, the vehicle 106 can avoid an inaccurate determination of whether to stop. The determination of whether to stop based on the non-drivable area 122 can be different from the determination of whether to stop based on the non-drivable area 322 if they are handled separately. The vehicle 106 can perform an accurate and efficient determination of the stop line 324, based on the non-drivable area 122 and the non-drivable area 322 being fused together.

Figure 4:
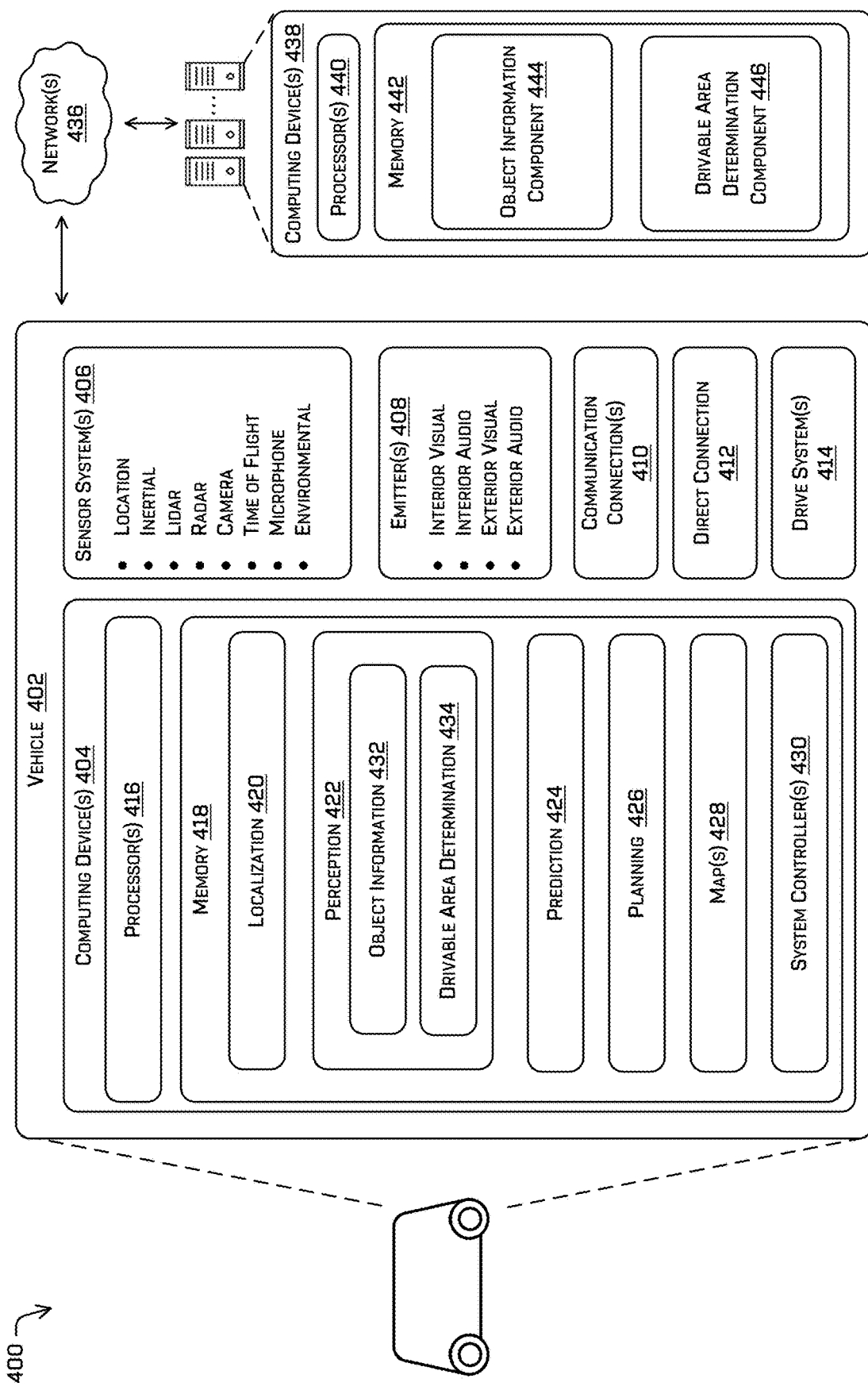
FIG. 4 is a block diagram illustrating an example system for determining how to control a vehicle approaching an object that may potentially maneuver around another object.

FIG. 4 is a block diagram illustrating an example system 400 for determining how to control a vehicle approaching an object that may potentially maneuver around another object as described herein. In at least one example, system 400 can include a vehicle 402, which can be the same vehicle as vehicles 106 described above with reference to FIGS. 1-3. Vehicle 402 can include one or more vehicle computing devices 404, one or more sensor systems 406, one or more emitters 408, one or more communication connections 410, at least one direct connection 412, and one or more drive systems 414. In at least one example, sensor system(s) 406 can generate the sensor data described above with reference to FIGS. 1 and 2.

Vehicle computing device(s) 404 can include processor(s) 416 and memory 418 communicatively coupled with processor(s) 416. In the illustrated example, vehicle 402 is an autonomous vehicle. However, vehicle 402 could be any other type of vehicle. In the illustrated example, memory 418 of vehicle computing device(s) 404 stores a localization system 420, a perception system 422, a prediction system 424, a planning system 426, a map storage 428, and one or more system controllers 430. Although these systems and components are illustrated, and described below, as separate components for ease of understanding, functionality of the various systems and controllers may be attributed differently than discussed. By way of non-limiting example, functionality attributed to perception system 422 may be carried out by localization system 420 and/or prediction system 424. Moreover, fewer or more systems and components may be utilized to perform the various functionalities described herein. Furthermore, though depicted in FIG. 4 as residing in memory 418 for illustrative purposes, it is contemplated that localization system 420, perception system 422, prediction system 424, planning system 426, and/or one or more system controllers 430 can additionally, or alternatively, be accessible to vehicle 402 (e.g., stored on, or otherwise accessible by, memory remote from vehicle 402).

Map storage 428 may store one or more maps. A map can be any number of data structures modeled in two dimensions or three dimensions that can provide information about an environment, such as, but not limited to, topologies (such as intersections), streets, mountain ranges, roads, terrain, and the environment in general.

As also illustrated in FIG. 4, perception system 422 can include an object information system 432 and a drivable area determination system 434. Object information system 432 may perform any of the functions utilized to determine information associated with any of the objects as described above with reference to FIGS. 1-3C. Drivable area determination system 434 may perform any of the functions utilized to determine information associated with any of the drivable areas as described above with reference to FIGS. 1-3C. Although information associated with drivable areas may be determined by drivable area determination system 434 as discussed above in this disclosure, it is not limited as such. Information associated with one or more areas (e.g., one or more drivable areas (e.g., the drivable area 120) and/or one or more non-drivable areas (e.g., the non-drivable area 122), etc.) may be determined by drivable area determination system 434.

In at least one example, localization system 420 can include functionality to receive data from sensor system(s) 406 to determine a position and/or orientation of vehicle 402 (e.g., one or more of an x-, y-, z-position, roll, pitch, or yaw). For example, localization system 420 can include and/or request/receive a map of an environment (e.g., from map storage 428) and can continuously determine a location and/or orientation of the autonomous vehicle within the map. In some instances, localization system 420 can utilize SLAM (simultaneous localization and mapping), CLAMS (calibration, localization and mapping, simultaneously), relative SLAM, bundle adjustment, non-linear least squares optimization, differential dynamic programming, or the like to receive image data, lidar data, radar data, IMU data, GPS data, wheel encoder data, and the like to accurately determine a location of the autonomous vehicle. In some instances, localization system 420 can provide data to various components of vehicle 402 to determine an initial position of an autonomous vehicle for generating a trajectory for travelling in the environment.

In some instances, perception system 422 can include functionality to perform object detection, segmentation, and/or classification. In some examples, perception system 422 can provide processed sensor data associated with the environment through which vehicle 402 is travelling. The perception system may also include a classification of an entity (e.g., an object determined based on the processed sensor data) as an entity type (e.g., car, pedestrian, cyclist, animal, building, tree, road surface, curb, sidewalk, unknown, etc.). For instance, perception system 422 may compare sensor data to object information (e.g., information associated with one or more objects that is determined as part of the functions discussed above in FIGS. 1-3C) to determine the classification. In additional and/or alternative examples, perception system 422 can provide processed sensor data that indicates one or more characteristics associated with a detected object and/or the environment in which the object is positioned. In some examples, characteristics associated with an object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), a bounding box associated with the object, etc. Characteristics associated with the environment can include, but are not limited to, a presence of another object in the environment, a state of another object in the environment, a time of day, a day of a week, a season, a weather condition, an indication of darkness/light, etc.

In some examples, object information system 432 can determine and provide information associated with one or more objects that are in the environment through which vehicle 402 is traveling (e.g., object(s) that are proximate to vehicle 402), such as objects 108, 110, 302, 310, and/or 318. For the purposes of this discussion, any object information (e.g., information output by object information system 432), such as information associated with an object that is stationary or an object that is not stationary, information associated with a likelihood that an object in an oncoming lane will likely pass another object, information associated with a likelihood that the object in the oncoming lane will likely return to the oncoming lane after passing the stationary object, etc., may be also referred to as, but is not limited to being, perception data.

Drivable area determination system 434 can determine and provide one or more drivable areas and/or information associated with the drivable area(s), such as the drivable area 112, the drivable area 120, the drivable area 304, the drivable area 312, and/or the drivable area 320 as discussed above with reference to FIGS. 1-3C. Alternatively or additionally, drivable area determination system 434 is configured to determine one or more non-drivable areas and/or information associated with the non-drivable area(s), such as the non-drivable area 114, the non-drivable area 122, the non-drivable area 306, the non-drivable area 314, and/or the non-drivable area 322.

Although illustrated as a part of perception system 422, in some examples and implementations, any or both of object information 432 and drivable area determination system 434 may be a separate block in memory 418. Any or both of object information system 432 and drivable area determination system 434 can access sensor data from sensor system(s) 406, map data from map storage 428, object information from object information store 432, and outputs from one or more of localization system 420, perception system 422, and/or prediction system 424 (e.g., processed data). By way of non-limiting example, perception system 422 (e.g., object information determination system 432 and/or drivable area determination system 434) may access (e.g., retrieve or receive) one or more planned paths and/or one or more trajectories, which can be determined by planning system 426 as discussed below.

For the planned path(s), drivable area determination system 434 may determine, at discrete points along the planned path(s), lateral distances (e.g., distances associated with the planned path(s) that can be implemented as, or utilized to determine, the distances 204 and the distances 206, respectively, as discussed above with reference to FIG. 2A) from the path to the object(s) in the environment. For example, the distances may be received as data (e.g., a portion of the perception data generated by perception system 422), and/or may be determined using mathematical and/or computer vision models, such as ray casting techniques. Various lateral distances may then be adjusted to account for other factors. For example, it may be desirable to maintain a minimum distance between vehicle 402 and the object(s) in the environment. In implementations of this disclosure, information about the object(s), including semantic classifications, may be used to determine those distance adjustments.

In some examples, drivable area determination system 434 can utilize prediction data determined by prediction system 424. Drivable area determination system 434 can utilize the prediction data to determine the boundaries of the drivable area (e.g., based on one or more of an uncertainty in position, velocity, acceleration in addition to, or alternatively, with a semantic classification of the object). For instance, if the prediction data indicates that a pedestrian walking along the shoulder is behaving erratically, drivable area determination system 434 can determine an increased offset of the drivable area proximate the pedestrian. In some examples where vehicle 402 is not autonomous, prediction system 424 may provide an indication (e.g., an audio and/or visual alert) to a driver of a predicted event that may affect travel.

In some examples, the lateral distances may further be adjusted based on the predictions associated with the objects. For example, the prediction data may include a confidence score and the lateral distance may be adjusted based on the confidence score, e.g., by making a greater adjustment for less confident predictions and slighter or no adjustments for more confident predictions. Using the adjusted distances, drivable area determination system 434 may define boundaries of the drivable area. In at least some examples, the boundaries may be discretized (e.g., every 10 cm, 40 cm, 1 m, etc.) and information regarding the boundary may be encoded (e.g., lateral distance to the nearest object, semantic classification of the nearest object, confidence and/or probability score associated with the boundary, etc.). As described herein, the trajectory determined by planning system 426 may be confined by, and in accordance with, the drivable area. While one or more of the functionalities of object information system 432 and/or or drivable area system 434 may be carried out by perception system 422, object information system 432 and/or drivable area determination system 434 may be separate from perception system 422.

Prediction system 424 can access sensor data from sensor system(s) 406, map data from map storage 428, and, in some examples, perception data output from perception system 422 (e.g., processed sensor data). In at least one example, prediction system 424 can determine features associated with objects based at least in part on the sensor data, the map data, and/or the perception data. As described above, features can include an extent of an object (e.g., height, weight, length, etc.), a pose of an object (e.g., x-coordinate, y-coordinate, z-coordinate, pitch, roll, yaw), a velocity of an object, an acceleration of an object, and a direction of travel of an object (e.g., a heading). Moreover, prediction system 424 may be configured to determine a distance between an object and a proximate driving lane, a width of a current driving lane, proximity to a crosswalk, semantic feature(s), interactive feature(s), etc.

Prediction system 424 can analyze features of objects to predict future actions of the objects. For instance, prediction system 424 can predict movement (e.g., movement of one or more objects), such as lane changes, decelerations, accelerations, turns, changes of direction, or the like. For the purposes of this discussion, any information output by the prediction system 424 including any determination based on sensor data, map data, perception data, etc. may be referred to as, but is not limited to being, prediction data. Prediction system 424 can send the prediction data to perception system 422 (e.g., object information 432 and/or drivable area determination system 434).

In some examples, prediction system 424 can include functionality to determine predicted point(s) representing predicted location(s) of an object in the environment. Prediction system 424, in some implementations, can determine a predicted point associated with a heat map based at least in part on a cell associated with a highest probability and/or based at least in part on cost(s) associated with generating a predicted trajectory associated with the predicted point.

For example, prediction system 424 can select a point, cell, or region of a heat map as a predicted point based at least in part on evaluating one or more cost functions associated with risk factors, safety, and vehicle dynamics, just to name a few examples. Such costs may include, but are not limited to, a positional-based cost (e.g., limiting the distance allowed between predicted points), a velocity cost (e.g., a constant velocity cost enforcing a constant velocity through the predicted trajectory), an acceleration cost (e.g., enforcing acceleration bounds throughout the predicted trajectory), an expectation that the object may follow rules of the road, and the like. In at least some examples, the probability associated with the cell may be multiplied with the cost (which, in at least some examples, may be normalized) such that the point (e.g., a candidate point) associated with the highest value of the cost times probability is selected as the predicted point associated with an object at a particular time.

In some examples, the prediction data can include object information (e.g., the predicted point(s), the predicted location(s), etc.) associated with the object (e.g., any of one or more stationary objects (e.g., one or more of the objects 108, 302, 310, and 318, as discussed above with reference to FIGS. 1-3C), one or more moving objects (e.g., the object 110, as discussed above with reference to FIGS. 1-3C), etc.). The object information can be utilized to indicate a likelihood of whether an oncoming object (e.g., the object 110) passing another object (e.g., the object 108) is an oncoming object.

In some examples, vehicle 402, based on the prediction data indicating the determination of the oncoming object passing the other object, can resume travelling after the oncoming object re-enters the oncoming traffic lane. In some examples, vehicle 402 can determine to control movement while using the prediction data based on the determination of the oncoming object passing the other object. In those examples, vehicle 402 can wait to move until the perception data is available again. Vehicle 402 can determine (e.g., verify), using the perception data, that the oncoming object has returned to the oncoming lane, and that the other object remains in the oncoming and/or outside of the lane of vehicle 402, before vehicle 402 begins to move.

In some examples, prediction system 424 can send the prediction data to perception system 422 (e.g., object information 432 and/or drivable area determination system 434), or vice versa (e.g., perception system 422 can send the perception data to prediction system 424. In those examples, and in the case in which the moving object is passing between vehicle 402 and the stationary object, vehicle 402 can utilize any of the data (e.g., one or more of the perception data and the prediction data) managed by prediction system 424 and/or perception system 422 to control vehicle 402.

In general, planning system 426 can determine a path for vehicle 402 to follow to traverse through an environment. For example, planning system 426 can determine various routes and trajectories and various levels of detail. For example, planning system 426 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, planning system 426 can generate an instruction for guiding the autonomous vehicle along at least a portion of the route from the first location to the second location. In at least one example, planning system 426 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for vehicle 402 to navigate. Thus, in example implementations described herein, planning system 426 may generate trajectories along which the vehicle can navigate, with the trajectories being contained within the drivable area.

In at least one example, localization system 420, perception system 422, prediction system 424, planning system 426, and/or drivable area determination system 434 can process sensor data, as described above, and can send their respective outputs over network(s) 436, to computing device(s) 438. In at least one example, localization system 420, perception system 422, prediction system 424, and/or planning system 426 can send their respective outputs to computing device(s) 438 at a particular frequency, after a lapse of a predetermined period of time, in near real-time, etc.

In at least one example, vehicle computing device(s) 404 can include one or more system controllers 430, which can be configured to control steering, propulsion, braking, safety, emitters, communication, and other systems of vehicle 402. These system controller(s) 430 can communicate with and/or control corresponding systems of drive system(s) 414 and/or other components of vehicle 402. For example, system controllers 430 may cause the vehicle to traverse along a drive path determined by perception system 422, e.g., in a drivable area determined by drivable area determination system 434.

In at least one example, sensor system(s) 406 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), etc. sensor system(s) 406 can include multiple instances of each of these or other types of sensors. For instance, the lidar sensors can include individual lidar sensors located at the corners, front, back, sides, and/or top of vehicle 402. As another example, the camera sensors can include multiple cameras disposed at various locations about the exterior and/or interior of vehicle 402. sensor system(s) 406 can provide input to vehicle computing device(s) 404. Additionally and/or alternatively, sensor system(s) 406 can send sensor data, via network(s) 436, to computing device(s) 438 at a particular frequency, after a lapse of a predetermined period of time, in near real-time, etc.

Vehicle 402 can also include one or more emitters 408 for emitting light and/or sound. Emitter(s) 408 in this example include interior audio and visual emitters to communicate with passengers of vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. Emitter(s) 408 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, emitter(s) 408 can be disposed at various locations about the exterior and/or interior of vehicle 402.

Vehicle 402 can also include communication connection(s) 410 that enable communication between vehicle 402 and other local or remote computing device(s). For instance, communication connection(s) 410 can facilitate communication with other local computing device(s) on vehicle 402 and/or drive system(s) 414. Also, communication connection(s) 410 can allow the vehicle to communicate with other nearby computing device(s) (e.g., other nearby vehicles, traffic signals, etc.). Communications connection(s) 410 also enable vehicle 402 to communicate with a remote teleoperations computing device or other remote services.

Communications connection(s) 410 can include physical and/or logical interfaces for connecting vehicle computing device(s) 404 to another computing device or a network, such as network(s) 436. For example, communications connection(s) 410 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

In at least one example, vehicle 402 can include drive system(s) 414. In some examples, vehicle 402 can have a single drive system 414. In at least one example, if vehicle 402 has multiple drive systems 414, individual drive systems 414 can be positioned on opposite ends of vehicle 402 (e.g., the front and the rear, etc.). In at least one example, drive system(s) 414 can include sensor system(s) to detect conditions of drive system(s) 414 and/or surroundings of vehicle 402. By way of example and not limitation, sensor system(s) 406 can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s) can be unique to drive system(s) 414. In some cases, the sensor system(s) 406 on drive system(s) 414 can overlap or supplement corresponding systems of vehicle 402 (e.g., sensor system(s) 406).

Drive system(s) 414 can include many of the vehicle systems, including a high voltage battery, a motor to propel vehicle 402, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, drive system(s) 414 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of drive system(s) 414. Furthermore, drive system(s) 414 also include communication connection(s) that enable communication by the respective drive module with other local or remote computing device(s).

As described above, vehicle 402 can send sensor data to computing device(s) 438 via network(s) 436. In some examples, vehicle 402 can send raw sensor data to computing device(s) 438. In other examples, vehicle 402 can send processed sensor data and/or representations of sensor data to computing device(s) 438 (e.g., data output from localization system 420, perception system 422, prediction system 424, and/or planning system 426). In some examples, vehicle 402 can send sensor data to computing device(s) 438 at a particular frequency after a lapse of a predetermined period of time, in near real-time, etc.

Computing device(s) 438 can receive sensor data (raw or processed) from vehicle 402 and/or one or more other vehicles and/or data collection devices and can determine a drivable area based on the sensor data and other information. In at least one example, computing device(s) 438 can include processor(s) 440 and memory 442 communicatively coupled with processor(s) 440. In the illustrated example, memory 442 of computing device(s) 438 stores object information component 444 and a drivable area determination component 446, for example. In at least one example, the object information component 444 can correspond to, and/or be implemented in a similar way as, the object information system 432. Moreover, object information component 444 can perform one or more operations as described above and ascribed to object information system 432. In at least one example, drivable area determination component 446 can correspond to, and/or be implemented in a similar way as, drivable area determination component 434. Moreover, drivable area determination component 446 can perform one or more operations as described above and ascribed to drivable area determination system 434.

Processor(s) 416 of vehicle 402 and processor(s) 440 of computing device(s) 438 can be any suitable processor capable of executing instructions to process data and perform operations as described herein. By way of example and not limitation, processor(s) 416 and 440 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 442 are examples of non-transitory computer-readable media. Memory 418 and 442 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of vehicle 402 can be associated with computing device(s) 438 and/or components of computing device(s) 438 can be associated with vehicle 402. That is, vehicle 402 can perform one or more of the functions associated with computing device(s) 438, and vice versa. Moreover, although various systems and components are illustrated as being discrete systems, the illustrations are examples only, and more or fewer discrete systems may perform the various functions described herein.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Figure 5:
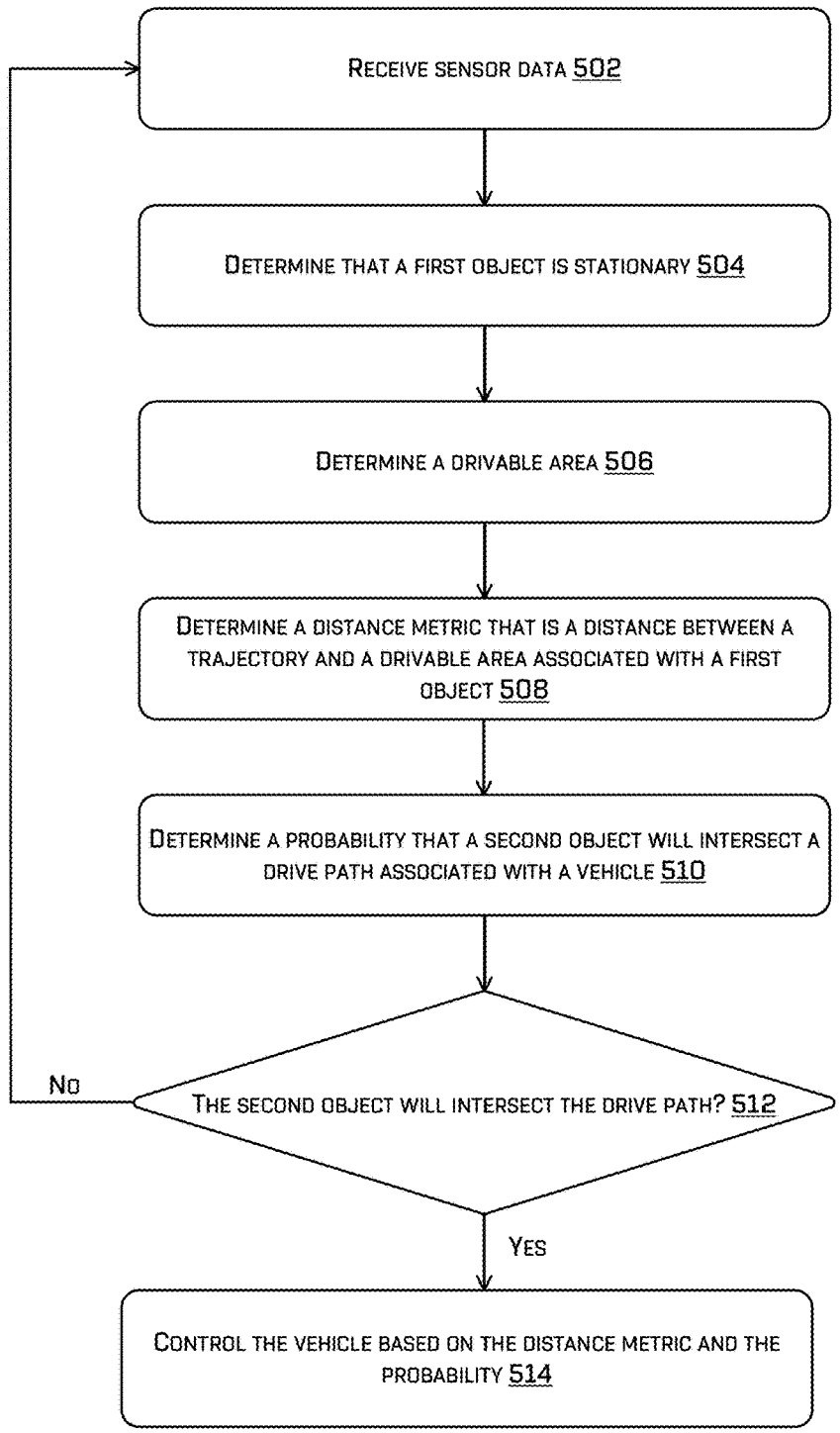
FIG. 5 depicts an example process for determining how to control a vehicle approaching an object that may potentially maneuver around another object.

FIG. 5 depicts an example process 500 for determining how to control a vehicle approaching an object that may potentially maneuver around another object.

At operation 502, the process may include receiving sensor data. The sensor data may be determined by the vehicle 106, traveling through the environment. The sensor data may be received by one or more sensors associated with the vehicle 106.

At operation 504, the process may include determining that a first object (e.g., the object 108) is stationary. The object 108 may be determined to be stationary based on motion of the object 108 being determined to be less than the threshold motion, or a second object (e.g., the object 110) moving and encountering the pass line 212. The object 108 can be an oncoming vehicle.

At operation 506, the process may include determining a drivable area. The drivable area 120 can be determined as an area of the road, omitting an area associated with the object 108.

At operation 508, the process may include determining a distance metric that is a distance between a trajectory and a drivable area associated with the object 108. The distance metric (e.g., a first distance metric) can be a distance between a side (e.g., an edge) of a point on the drivable area 120 or the object 108 and a point on the trajectories 202. Another distance metric (e.g., a second distance metric) can be determined as a combination of a width (e.g., a side-to-side distance) of the second object and a buffer that is an additional distance.

At operation 510, the process may include determining a probability that the object 110 will intersect a drive path associated with the vehicle 106. The probability (e.g., likelihood) can be based on a determination of the object 110 passing the object 108. In some examples, the drive path can be implemented as being one of the trajectories 202. In other examples, the drive path can be implemented as being a separate path associated with one of the trajectories 202

At operation 512, the process may include, if the second object will intersect the drive path, continuing to 502. If the second object will not intersect the drive path, the process may include continuing to 514.

At operation 514, the process may include controlling the vehicle 106 based on the distance metric and the probability. For example, the vehicle 106 can be controlled based on the probability (e.g., a first probability) that the second object will intersect the drive path, and a probability (e.g., a second probability) that the object 110 will not yield. The vehicle 106 can be controlled to stop at the stop line 128 based on determining the object 110 will intersect the drive path and the object 110 will not yield.

Figure 6:
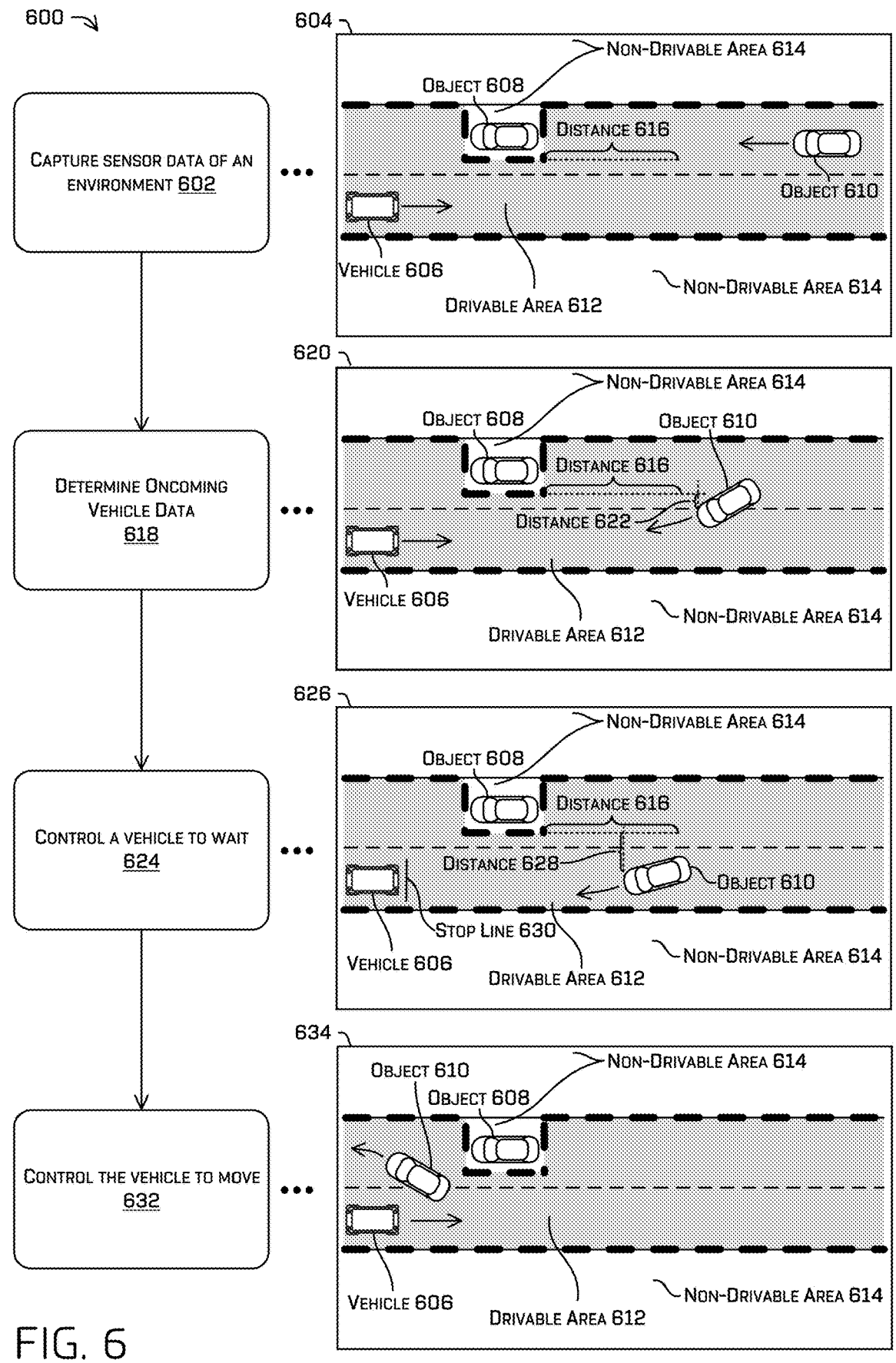
FIG. 6 is a pictorial flow diagram of an example process 700 for determining how to control a vehicle approaching an object that may potentially swerve into a lane of the vehicle.

FIG. 6 is a pictorial flow diagram of an example process 600 for determining how to control a vehicle approaching an object that may potentially swerve (or otherwise enter) into a lane of the vehicle.

An operation 602 can include capturing sensor data of an environment, as illustrated in an example 604. A vehicle 606 travelling through the environment can capture the sensor data in a similar way as in the operation 102, as discussed above with reference to FIG. 1. The vehicle 606 can be implemented in a similar way as, or a different way from, the vehicle 106.

The environment may include one or more objects. The object(s) may include an object 608, which may be similar to, or different from, any of the objects (e.g., the object 108) in the environment illustrated in the example 104. The object 608 may travel in a similar way as, or a different way from, the object 108. In some examples, the object 608 may be a stationary object. The object(s) may include an object 610, which may be similar to, or different from, any of the objects (e.g., the object 110) in the environment illustrated in the example 104. The object 610 may travel in a similar way as, or a different way from, than the object 108.

In some examples, the object 610 may be a moving object travelling toward, and/or at least partially into, a lane of the vehicle 606. In those examples, the object 610 may begin travelling toward (e.g., moving laterally), and/or at least partially into, the lane of the vehicle 606 at a location (e.g., a swerve start location) in the environment that is different from the location (e.g., a swerve start location) at which the object 110, as discussed above with reference to FIG. 1, begins to travel toward, and/or at least partially into, the lane of the vehicle 106. A distance between the object 608 and the swerve start location associated with the object 610 can be greater than, or equal to, a distance between the object 108 and the swerve start location associated with the object 110.

The environment may include a drivable area 612 and a non-drivable area 614. The drivable area 612 may be similar to, or different from, the drivable area 120. The non-drivable area 614 may be similar to, or different from, the non-drivable area 122. The drivable area 612 and the non-drivable area 614 can be determined in a similar way as the drivable area 120 and the non-drivable area 122, respectively.

The sensor data can be utilized to determine one or more distances associated with the object 608 and/or the object 610. The distance(s) may include a distance (e.g., a first distance) (e.g., a longitudinal distance) 616. The distance 616, which can be associated with the object 608, can be implemented in a similar way as the distance 704, as discussed below with reference to FIG. 7A. The sensor data can be utilized to determine one or more distance metrics. The distance metric(s) can include a distance metric (e.g., a first distance metric) representing the distance 616. In some examples, the distance 616 can be determined based on a classification (e.g., a sedan, a van, an articulated truck, etc.), one or more characteristics (e.g., speeds, sizes, maneuverability, etc.), one or more dynamics (e.g., lateral motion), and/or one or more physical constraints of individual ones of one or more of the objects (e.g., the object 608, the object 610, etc.) in the environment.

A longitudinal distance associated with the object 610 can be utilized to determine whether determining of oncoming vehicle data (e.g., determining of oncoming vehicle data 618, as discussed below) is triggered. The longitudinal distance associated with the object 610 can be implemented in a similar way as the distance 706, as discussed below with reference to FIG. 7A. Whether some of all (e.g., one or more portions) of the determining of the oncoming vehicle data is triggered can be determined in a similar way as discussed below with reference to FIG. 7A.

An operation 618 can include determining oncoming vehicle data, as illustrated in an example 620. A portion of the determining of the oncoming vehicle data can include determining a distance metric (e.g., a second distance metric) representing a distance (e.g., a lateral distance) 622 between the first point associated with the object 608 and a point (e.g., a second point) associated with the object 610. The lateral distance can be implemented in a similar way as the distance 708, as discussed below with reference to FIG. 7A. A portion of the determining of the oncoming vehicle data can include determining an aggregated distance metric comprising the second distance metric, a width and/or length (e.g., a side-to-side distance) of the object 610, and a buffer distance, as discussed below with respect to FIG. 7B.

An operation 624 can include controlling the vehicle 606 to wait (e.g., yield), as illustrated in an example 626. The lateral distance 622 can change to a lateral distance 628, based on movement of the object 610. The lateral distance 628 be implemented in a similar way as the distance 716, as discussed below with reference to FIG. 7B. The vehicle 606 can be controlled to wait based on an area in front of the vehicle 606 being large enough for the object 610 to maneuver back into the oncoming lane. The vehicle 606 can determine the area in front of the vehicle 606 that is large enough for the object 610 to maneuver back into its lane after passing the object 608. The vehicle 606 can determine the area is large enough for the object 610 to maneuver back into its lane by travelling between the vehicle 606 and the object 608 (e.g., between the vehicle 606 and the portion of the non-drivable area 614 that includes the object 608).

The vehicle 606 can be controlled to wait at a stop line 630 based on the comparison between the longitudinal distance associated with the object 610 and the distance 616. The stop line 630 can be utilized as a location at which to stop vehicle 606 based on one or more results of the corresponding portion(s) of the determining of the oncoming vehicle data, as discussed below with reference to FIGS. 7A and 7B.

By utilizing the comparison between the longitudinal distance associated with the object 610 and the distance 616 to trigger determining of the aggregated distance metric, the stop line 630 can be determined and utilized to control the vehicle 606. The vehicle 606 waiting at the stop line 630 can increase safety of the vehicle and reduce traffic congestion, in contrast to vehicles being controlled according to conventional technology or techniques.

An operation 632 can include controlling the vehicle 606 to move, as illustrated in an example 634. The vehicle 606 can be controlled to move in a similar way as for the vehicle 106 in the operation 130, as discussed above with reference to FIG. 1.

Figure 7A:
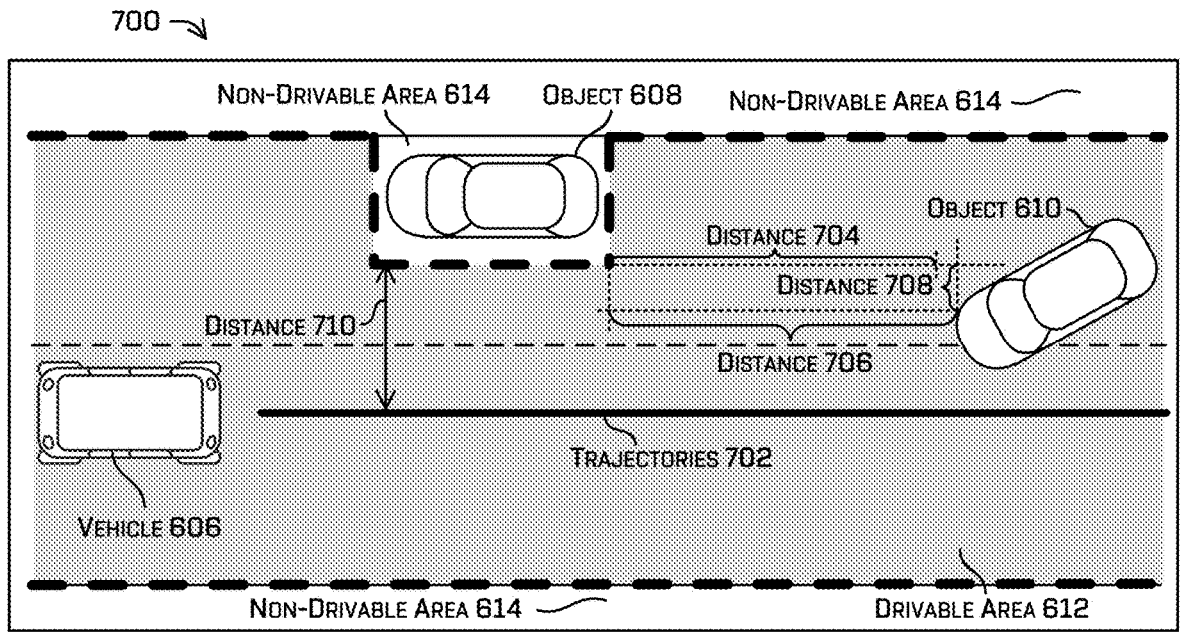
FIGS. 7A and 7B illustrate examples of an environment including a vehicle approaching an object that may potentially swerve into a lane of the vehicle.
Figure 7B:
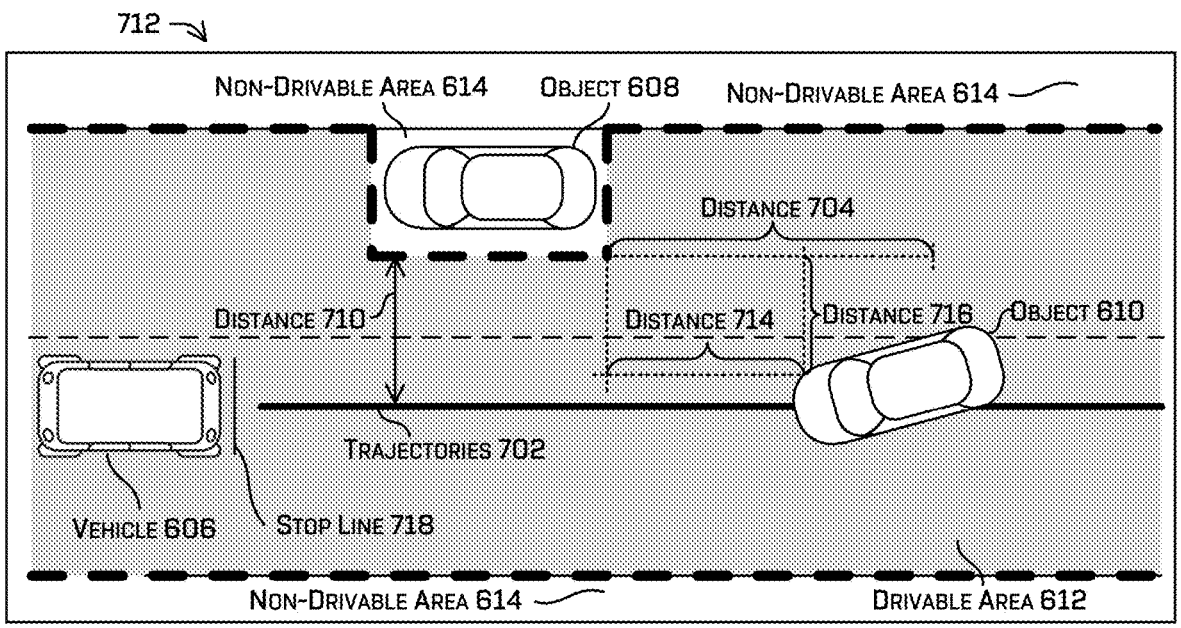

FIGS. 7A and 7B illustrate examples of an environment including a vehicle approaching an object that may potentially swerve or otherwise enter into a lane of the vehicle. FIG. 7A illustrates evaluating the environment with respect to a drivable area, objects, and trajectories, to determine whether to trigger, and/or refrain from triggering of, determining of one or more portions of oncoming vehicle data.

As illustrated in FIG. 7A, an example 700 can include the vehicle 606 travelling in a lane of a road in the environment. The vehicle 606 can travel in a direction toward a portion of the lane that is adjacent to the object 608, around which another object (e.g., the object 610) may potentially maneuver, as discussed above with reference to FIG. 6. The vehicle 606 can capture sensor data utilized to determine information (e.g., the drivable area 612 and/or the non-drivable area 614) associated with the environment.

The vehicle 606 can determine trajectories 702. The trajectories 702 can be determined for, and utilized to control, the vehicle 606, in a similar way as for the trajectories 202 being determined for, and utilized to control, the vehicle 106, as discussed above with reference to FIG. 2A.

The sensor data can be utilized to determine oncoming vehicle data, which can include one or more distances associated with the object 608 and/or the object 610. The distance(s) can include a distance (e.g., a first distance) (e.g., a threshold longitudinal distance) 704. The distance 704 can be determined based on the object 608 (e.g., one or more characteristics (e.g., speeds, sizes, maneuverability, etc.), one or more dynamics (e.g., lateral motion, longitudinal motion, etc.), and/or one or more physical constraints of the object 608). The distance 704 can be determined based on one or more points associated with the object 608. By way of example, the distance 704 can be determined based on points including a first threshold reference point and a second threshold reference point associated with the object 608. The distance 704 can be between the first threshold reference point and the second threshold reference point.

In some examples, the first threshold reference point can be interpreted as being associated with the non-drivable area 614 (e.g., a portion of the non-drivable area 614 that includes the object 608). In those examples, the first threshold reference point can be at a corner of the portion of the non-drivable area 614 that is nearest to the object 608. The corner of the portion of the non-drivable area 614 may be utilized as the first threshold reference point based on the corner being furthest from an edge of a side of the road (e.g., a side of a lane of the road) in which the object 610 is travelling, and nearest to the object 608. Although the corner of the bumper of the object 610 can be utilized as the first threshold reference point, as discussed above in this disclosure, it is not limited as such. Any portion of the object 610 can be utilized as the first threshold reference point, to implement any of the techniques as discussed herein in a similar way as for the corner of the bumper of the object 610, such as, a side mirror, a tire, a headlight, etc.

In some examples, the second threshold reference point can be determined based on a predetermined distance between the point associated with the first threshold reference point and the second threshold reference point. The distance 704 can be determined as the predetermined distance.

The distance(s) can include a distance (e.g., a second distance) (e.g., a longitudinal distance) 706 associated with the object 610. The distance 706 can be determined based on the object 608 and the object 610. The distance 706 can be determined based on one or more points associated with the object 608 and the object 610. The distance 706 can be a longitudinal distance between points that include a point (e.g., the first point) associated with the object 608, and a point (e.g., the second point) associated with the object 610. In some examples, the longitudinal distance 706 can be interpreted as the longitudinal portion (e.g., component) of a distance between the second point and an intersection point (e.g., a first intersection point at a first intersection between a line extending laterally from the first point and a line extending longitudinally from the second point).

Various portions of the object 608 and the object 610 can be utilized as the first point and the second point, respectively. In some examples, the first threshold reference point can be determined as the first point associated with the object 608. In other examples, the first point associated with the object 608 can be different from the first threshold reference point. In those examples, any portion of the object 610 can be utilized as the first point associated with the object 608, such as, a side mirror, a tire, a headlight, etc. In some examples, the second point associated with the object 610 can be a portion (e.g., a corner of a bumper) of the object 610 that is nearest to the object 608. In those examples, the corner of the object 610 may be utilized as the first point based on the corner being nearest an edge of a side of the road (e.g., an edge of the lane) in which the object 610 is travelling, and that is nearest to the object 608. Although the corner of the bumper of the object 610 can be utilized to determine the longitudinal distance associated with the object 610, as discussed above in this disclosure, it is not limited as such. Any portion of the object 610 can be utilized to implement any of the techniques as discussed herein in a similar way as for the bumper of the object 610, such as, a side mirror, a tire, a headlight, etc.

The distance(s) can include a distance (e.g., a third distance) (e.g., a lateral distance) 708 associated with the object 610. The distance 708 can be determined based on one or more points associated with the object 608 and the object 610. The distance 708 can be a lateral distance (e.g., a lateral portion (e.g., component) of a distance) between points that include a point (e.g., the first point) associated with the object 608 and/or the object 610, and a point (e.g., the second point) associated with the object 610. In some examples, the lateral distance 708 can be interpreted as the lateral portion (e.g., component) of a distance between the second point and an intersection point (e.g., a second intersection point at a second intersection between a line extending longitudinally from the first point and a line extending laterally from the second point). Individual ones of the distance(s) (e.g., the distances 704, 706, and/or 708) can be determined dynamically (e.g., determined in real time, at intervals of time (e.g., 0.001 second (s), 0.01 s, 0.1 s, 1 s, etc.)). Amounts of corresponding intervals (e.g., periodic intervals or varying intervals) can vary based on the sensor data associated with the environment (e.g., a velocity, a location, an orientation, etc., of the object 610).

The distance(s) can include a distance (e.g., a fourth distance) (e.g., a lateral distance (e.g., a threshold lateral distance)) 710 associated with the object 608. The distance 710 can be determined based on one or more points associated with the object 608 and candidate trajectories (e.g., the trajectories 702). The distance 710 can be a lateral distance (e.g., a lateral portion (e.g., component) of a distance) between points that include a point (e.g., the first point) associated with the object 608, and a point (e.g., a third point) associated with the trajectories 702. Although the third point may be associated with the trajectories 702, as discussed above in this disclosure, it is not limited as such. In some examples, the third point can be determined to be at any portion of the vehicle 606 (e.g., a corner of a bumper of the vehicle 606 nearest to the object 608) (e.g., a middle point of a side of the vehicle 606, the side being nearest to the object 608), and can be utilized to implement the third point in any of the techniques discussed throughout this disclosure.

The oncoming vehicle data can include one or more distance metrics associated with the object 608 and/or the object 610. The distance metric(s) can include a distance metric (e.g., a first distance metric) representing the longitudinal distance 706 between the first point associated with the object 608 and the second point associated with the object 610. The distance metric(s) can include a distance metric (e.g., a second distance metric) representing the lateral distance 708 between the first point associated with the object 608 and the second point associated with the object 610. The distance metric(s) can include a distance metric (e.g., a third distance metric) representing the lateral distance 710 between the point the first point associated with the object 608, and the third point associated with the trajectories 702. The distance metric(s) can include a distance metric (e.g., an aggregated distance metric) including the second distance metric, a width and/or length (e.g., the side-to-side distance) of the object 610, and a buffer distance.

The vehicle 606 can utilize the sensor data to determine whether some or all (e.g., one or more portions) of determining of oncoming vehicle data is triggered. A portion (e.g., a first determining portion) of the determining of the oncoming vehicle data can include determining the lateral distance 708, and/or the second distance metric representing the lateral distance 708. A portion (e.g., a second determining portion) of the determining of the oncoming vehicle data can include determining the lateral distance 710, and/or the third distance metric representing the lateral distance 710. A portion (e.g., a third determining portion) of the determining of the oncoming vehicle data can include determining the aggregated distance metric. Whether the portion(s) of the determining of the oncoming vehicle data are triggered can be based on a comparison between the first distance metric (e.g., the longitudinal distance 706) and the threshold longitudinal distance 704. Triggering of any of one or more of the portion(s) of the determining of the oncoming vehicle data can include performing the corresponding triggered portion(s).

The longitudinal distance 706 can be utilized to trigger, or refrain from triggering, the portion(s) of the determining of the oncoming vehicle data in the operation 618. The longitudinal distance 706 being greater than, or equal to, the threshold longitudinal distance 704 can be utilized to trigger one or more of the portion(s) of the determining of the oncoming vehicle data in the operation 618, and to refrain from triggering one or more remaining portion(s). The longitudinal distance 706 being less than the threshold longitudinal distance 704 can be utilized to trigger the remaining portion(s) (e.g., one or more of the oncoming vehicle determining portion(s) that were not triggered prior to a time associated with the longitudinal distance 706 being less than the threshold longitudinal distance 704).

The portion(s) of the determining of the oncoming vehicle data not being triggered can be based on a result (e.g., a first result) of the comparison between the threshold longitudinal distance 704 and the longitudinal distance 706. In some examples, the first result indicating the longitudinal distance 706 is greater than, or equal to, the longitudinal distance 704 can be utilized to trigger the first determining portion (e.g., the determining of the lateral distance 708 and/or the second distance metric), and, in some instances, the second determining portion (e.g., the determining of the lateral distance 710 and/or third distance metric). In those examples, the first result can be utilized to refrain from triggering the third determining portion (e.g., the determining of the aggregated distance metric), and possibly the second determining portion such as in the instances in which the second determining portion is not to be triggered. In other examples, the first result indicating the longitudinal distance 706 is greater than, or equal to, the longitudinal distance 704 can be utilized to, in some instances, trigger the second determining portion. In those examples, the first result can be utilized to refrain from triggering the first determining portion and the third determining portion, and, possibly the second determining portion such as in the instances in which the second determining portion is not to be triggered. By not triggering some of the determining of the oncoming vehicle data when an oncoming vehicle is further than a threshold distance away from a stationary vehicle, computational resources may be conserved.

Although the distance 704 can be utilized according to various techniques, as discussed above in this disclosure, it is not limited as such. Any type of threshold value can be utilized, alternatively or in addition to, the distance 704, to implement any of the techniques discussed throughout this disclosure. The threshold value (e.g., a threshold time) can be utilized in a comparison with an object related value (e.g., a time until the object 610 passes the object 608), and/or a metric (e.g., a modified first metric based on the first distance metric (e.g., the longitudinal distance 706)) determined based on the object related value, to determine whether the portion(s) of the determining of the oncoming vehicle data are triggered. The comparison can be made between the threshold value and the object related value, which can be a same type as the type of the threshold value. Alternatively or additionally, the comparison can be made between the threshold value and the modified first distance metric, which can be a same type as the type of the threshold value.

In some examples, the threshold value can be the threshold time (e.g., the type of the threshold value can be a temporal type) (e.g., 10 seconds, 20 seconds, 30 seconds, 1 minute, etc.). The threshold time can be compared to the object related value (e.g., the time until the object 610 passes the object 608) and/or the modified first metric (e.g., a time metric). The time metric can be determined based on an estimated amount of time between a current time and an estimated point in time at which the object 610 will begin to pass the object 608 (e.g., an estimated point in time at which a portion (e.g., a nearest bumper) of the object 610 will begin to pass a portion (e.g., a nearest bumper) of the object 608). The determining of the oncoming vehicle data can be triggered based on the comparison between the between the time until the object 610 passes the object 608, and the threshold time, in a similar way as the comparison between the longitudinal distance 706 and the threshold longitudinal distance 704. The determining of the oncoming vehicle data can be triggered based on the comparison between the between the modified first metric and the threshold time, in a similar way as the comparison between the first distance metric (e.g., the longitudinal distance 706) and the threshold longitudinal distance 704.

In some examples, the threshold value (e.g., the threshold distance, the threshold time, etc.) can be determined based on the sensor data associated with the environment (e.g., a velocity, a location, a type, an orientation, etc., of the object 610). The threshold value (e.g., the threshold distance, the threshold time, etc.) can be determined based on a classification of one or more objects (e.g., the object 608, the object 610, etc.). The threshold value (e.g., the threshold distance, the threshold time, etc.) can be determined based on one or more characteristics (e.g., speeds, sizes, maneuverability, etc.), one or more dynamics (e.g., lateral motion), and/or one or more physical constraints of one or more of the objects (e.g., the object 608, the object 610, etc.). The classification can indicate whether individual ones of the object(s) are a type of vehicle (e.g., a sedan, a van, an articulated truck, etc.). For example, the threshold value determined based on the object 610 being a sedan may be greater than the threshold value determined based on the object 610 being an articulated truck. The vehicle 606 can, for instances in which the object 610 is the sedan, take movement of the object 610 into account at a greater distance or time from when the object 610 will pass the object 608 than for instances in which the object 610 is the articulated truck. As such, controlling of the vehicle 606 may compensate for different characteristics, dynamics, and/or physical constraints of the object 610 being the sedan in comparison to the articulated truck. The object 610, swerving into the lane of the vehicle 606 may result in the vehicle 606 waiting at a stop line (e.g., the stop line 718, discussed below) if the object 610 is the sedan, but not if the object 610 is the articulated truck. This may be because the articulated truck is determined to be more likely than the sedan to return to its lane before reaching the object 608, due to the velocity of the articulate truck being less than the velocity of the sedan.

In some examples, any thresholds (e.g., threshold values (e.g., threshold distances) as discussed throughout this disclosure can be determined based on corresponding distances (e.g., the distance 710) in a similar way as discussed above for the threshold distance being determined based on the distance 706. In those examples, any of the thresholds may be determined based on characteristics, dynamics, and/or physical constraints of one or more objects (e.g., the object 608, the object 610, etc.). By way of example, the distance 710 may be larger for the object 610 being the articulated truck than the sedan. This may allow for a larger space for the articulated truck to pass between the vehicle 606 and the object 608 than for the sedan.

FIG. 7B illustrates evaluating the environment with respect to a drivable area, objects, and trajectories, to determine whether to trigger determining of remaining portions of oncoming vehicle data. As illustrated in FIG. 7B, an example 712 can include the vehicle 606 travelling in the lane of the road in the environment, as discussed above with reference to FIG. 7A.

The distance(s) can include a distance (e.g., a second distance) (e.g., a longitudinal distance) 714 and a distance (e.g., a third distance) (e.g., a lateral distance) 716, based on the object 610 having moved from a previous position. The distance(s) can include the fourth distance. The distances 710, 714, and 716 can be determined in a similar way as the distances 710, 706, and 708, respectively, as discussed above with reference to FIG. 7A.

The remaining portion(s) of the determining of the oncoming vehicle data can be triggered (e.g., and performed) based on a result (e.g., a second result) of a comparison between the longitudinal distance 706 and the longitudinal distance 704. In those examples, the second result indicating the longitudinal distance 706 being less than the longitudinal distance 704 can be utilized to trigger the remaining portion(s) of the determining of the oncoming vehicle data. In some examples, for instance in a case in which the first determining portion is previously triggered (e.g., and performed) based on the first result, the second and third determining portions can be triggered (e.g., and performed) based on the second result. In other examples, for instance in a case in which the first determining portion and the second determining portion are previously triggered (e.g., and performed) based on the first result, the third determining portion can be triggered (e.g., and performed) based on the second result. In other examples, for instance in a case in which none of the determining portions are previously triggered (e.g., and performed) based on the first result, the first-third determining portions can be triggered (e.g., and performed) based on the second result.

The vehicle 606 can be controlled to wait based on a stop line 718 based on one or more of the distance(s) (e.g., the distance 716) and/or one or more of the distance metric(s) (e.g., the third distance metric and the aggregated distance metric). Triggering of the determining of the stop line 718 can be based on the aggregated distance metric (e.g., a sum of the distance 716, the width and/or length (e.g., the side-to-side distance) of the object 610, and the buffer distance) meeting or exceeding the third distance metric (e.g., the distance 710). The stop line 718 can be determined in a similar way as the stop line 128, as discussed above in FIG. 1. The stop line 718 can be utilized to implement the stop line 630, as discussed above in FIG. 6.

In some examples, the buffer distance in the aggregated distance metric can be determined in a similar way as the buffer distance in the distance metric as discussed above with reference to FIG. 2. In those examples, the buffer distance in the aggregated distance metric can be less than (e.g., ½ of) the buffer distance in the distance metric as discussed above with reference to FIG. 2. However, the current disclosure is not limited as such. In some examples, the buffer distance in the aggregated distance metric can be ¼, ¾, ⅚, etc., of the buffer distance in the distance metric as discussed above with reference to FIG. 2. In some examples, the buffer distance in the aggregated distance metric can be a same distance as the buffer distance in the distance metric as discussed above with reference to FIG. 2

The vehicle 606 can be controlled by utilizing a combined determination (e.g., a hybrid determination) that includes i) a passing object determination associated with an object that may potentially maneuver around another object), as discussed above with reference to FIGS. 2A and 2B, and ii) a swerving object determination associated with an object (that may potentially swerve into a lane of the vehicle, as discussed above with reference to FIGS. 7A and 7B. The passing object determination can include the determining of a passing object distance metric (e.g., a width and/or length distance of the object, or a combined distance (e.g. a sum) of a side-to-side distance of the object, and a buffer distance). The swerving object determination can include the determining of a swerving object distance metric (e.g., the aggregated distance metric) (e.g., a sum of the distance 716, the width of the object, and the buffer).

The vehicle 606 can be controlled by utilizing the hybrid determination by comparing the passing object distance metric and the swerving object distance metric. The hybrid determination can be utilized to determine the passing object distance metric or the swerving object distance metric as a hybrid metric. The vehicle 606, utilizing the hybrid determination, can be controlled with the passing object distance metric being determined as the hybrid metric, based on the passing object distance metric being greater than the swerving object distance metric. The vehicle 606, utilizing the hybrid determination, can be controlled with the swerving object distance metric being determined as the hybrid metric, based on the swerving object distance metric being greater than the passing object distance metric. The hybrid determination can include the hybrid metric being implemented in a similar way as the aggregated distance metric according to any of the techniques as discussed throughout this disclosure.

In some examples, the hybrid determination can switch from the swerving object distance metric being utilized as the hybrid metric to the passing object distance metric being utilized as the hybrid metric, and vice versa. Switching between the swerving object distance metric and the passing object distance metric, and vice versa, can occur (e.g., iteratively) any number of times and in any order/combination. For instance, in a case in which the object 610 swerves toward the lane of the vehicle 606 and then swerves back into the lane of the object 608 before the object 610 reaches the object 608, the vehicle 606 can be controlled based on the swerving object distance metric being switched to the passing object distance metric.

In some examples, the portion of the non-drivable area 614 can be determined to be slanted due to the object 608 being parked at an angle. The aggregated distance metric or the hybrid distance metric can be utilized to determine whether to trigger the determining of the stop line 128 for the slanted portion of the non-drivable area 614 in a similar way as for the portion (e.g., non-slanted portion) of the non-drivable area 614, as illustrated in FIGS. 7A and 7B.

In some examples, hysteresis can be utilized to determine a passing trigger, by which the vehicle 606 is controlled to wait (e.g., wait for a threshold amount of time) based on the stop line 718. The hysteresis can be utilized to determine hysteresis information (e.g., a length of time at which the vehicle 606 is controlled to wait at the stop line 718, a number of cycles in which the passing trigger is "locked"— despite sensor data to the contrary, and the like). By utilizing hysteresis, the vehicle 606 can be controlled to move, after waiting at the stop line 718, based on the hysteresis information indicating the object 610 is not likely to swerve into the lane of the vehicle 606 or pass the object 608. In some examples, the hysteresis information can be utilized to determine to control the vehicle 606 to move, based on an amount of time (e.g., an amount of wait time) from when the vehicle begins to wait and a current time meeting or exceeding the threshold amount of time. In those examples, when the amount of wait time meets or exceeds the threshold amount of time, the vehicle 606 can be controlled to stop waiting by performing the swerving object determination, or the hybrid determination, as discussed above, to control the vehicle 606 to move.

The determining of the oncoming vehicle data can be turned on (e.g., triggered) and/or turned off (e.g., untriggered) based on the hysteresis information, alternatively or in addition, to one or more of the determinations (e.g., the swerving object determination or the hybrid determination). The hysteresis information can include, and/or be determined based on, a classification, one or more characteristics (e.g., speeds, sizes, maneuverability, etc.), one or more dynamics (e.g., lateral motion), and/or one or more physical constraints of individual ones of one or more of the objects (e.g., the object 608, the object 610, etc.) in the environment.

Figure 8:
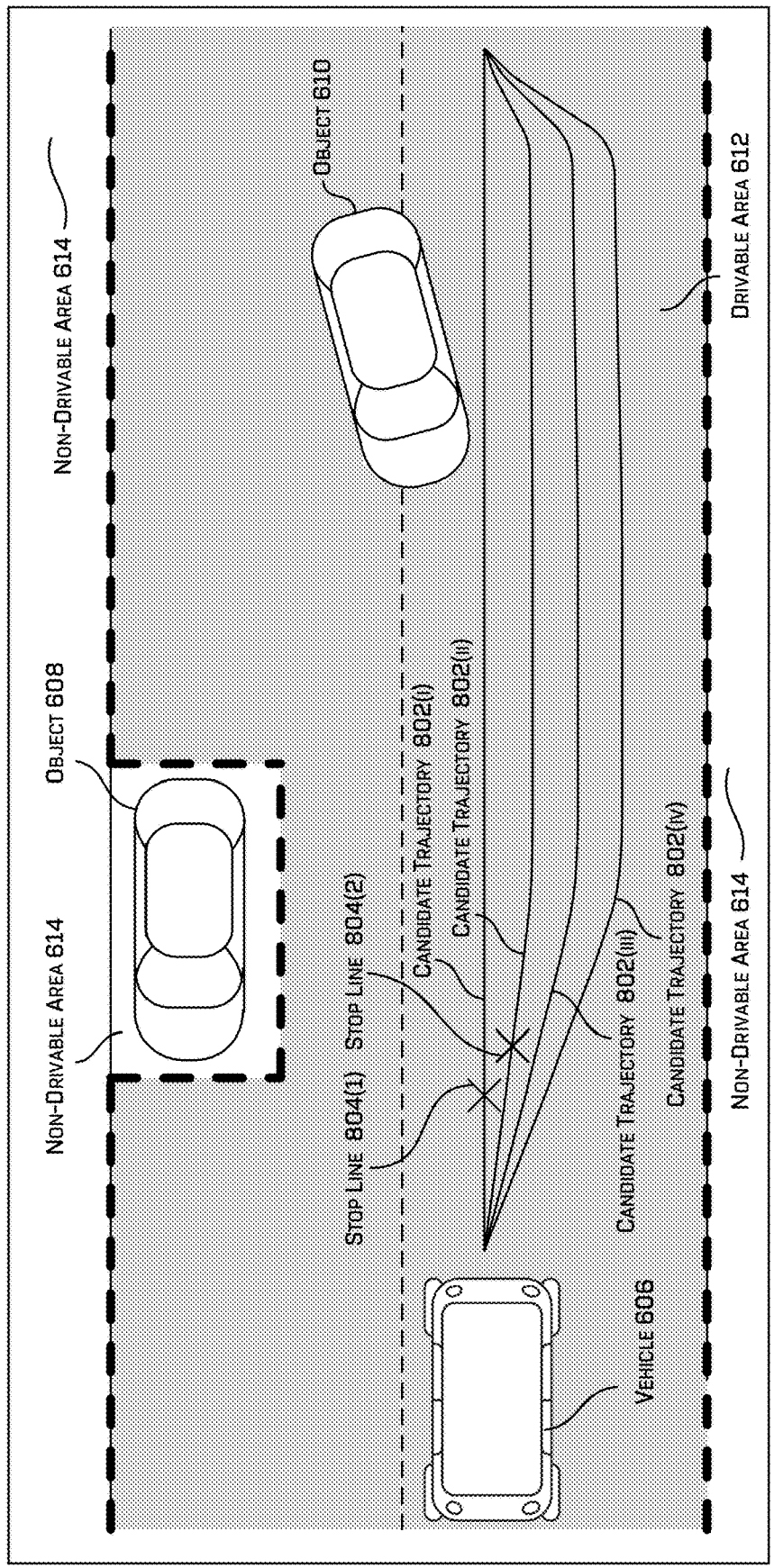
FIG. 8 illustrates an example of an environment including a vehicle approaching an object that may potentially swerve into a lane of the vehicle.

FIG. 8 illustrates an example of an environment including a vehicle approaching an object that may potentially swerve into a lane of the vehicle. FIG. 8 illustrates evaluating the environment based on trajectories, to determine stop lines to control the vehicle 606.

As illustrated in FIG. 8, an example 800 can include the vehicle 606 travelling in the lane of the road, as discussed above with reference to FIGS. 6-7B. The vehicle 606 can determine one or more candidate trajectories 802(*i*)-802(*iv*) (collectively referred to as candidate trajectories 802). The candidate trajectories 802 can be utilized to implement the trajectories 702.

The vehicle 606 can include a vehicle planning system that determines the candidate trajectories 802 for the vehicle 606 to traverse while in a single lane. That is, the planning system can consider the candidate trajectories 802 based on a location of the vehicle 606 in the environment. Each of the candidate trajectories 802 can be evaluated to determine safe operation of the vehicle 606 throughout the environment. In some examples, movement of the vehicle 606 determined by the techniques discussed herein can be used when evaluating a cost associated with each of the candidate trajectories 802, and accordingly, a trajectory can be selected or determined, as a lowest cost trajectory and from among the candidate trajectories 802, based on a lowest cost. For example, a trajectory biased closer to the object 108 can be selected because it results in the vehicle 606 being positioned further from a pedestrian in the road, or on a sidewalk adjacent to the road, absent other considerations. As another example, a trajectory biased closer to the object 608 can have a reduced velocity because of an increased collision probability based on the object 608. Accordingly, a trajectory biased away from the object 108 can be selected because it results in a higher velocity (e.g., and reduced travel time), absent other considerations.

In some examples, costs can be determined for each of the candidate trajectories 802 and corresponding stop lines. By way of example, a cost (e.g., a first cost) can be determined based on the candidate trajectory 802(*i*) and the stop line 804(1); and a cost (e.g., a second cost) can be determined based on the candidate trajectory 802(*i*) and the stop line 804(2). The vehicle 606 can be determined based on a lowest cost between the first cost and the second cost. The controlling of the vehicle 606 based on the costs associated with the candidate trajectories 802 and the corresponding stop lines 804 can be implemented according to any of the techniques as discussed herein, in a similar way as for the controlling of the vehicle 606 based on the costs associated with the candidate trajectories 802.

In some examples, the candidate trajectories 802, and the oncoming vehicle data associated with the corresponding candidate trajectories 802, can be implemented in parallel. Any functions associated with the trajectories 702, as discussed above with reference to FIGS. 7A and 7B, can be implemented in a similar way for individual ones of the candidate trajectories 802. By way of example, one or more distance(s) (e.g., a threshold longitudinal distance, a longitudinal distance, a lateral distance, and a threshold lateral distance) and one or more distance metric(s) (e.g., distance metrics associated with the corresponding distances), and, in some instances, a stop line, can be determined for each of the candidate trajectories.

In some examples, one or more stop lines 804(1)-804(2) (collectively referred to as stop lines 804) can be determined. The stop line 804(1) can be determined for the candidate trajectory 802(*i*). The stop line 804(2) can be determined for the candidate trajectory 802(*ii*). The stop lines 804(1) and 804(2) can be determined based on corresponding results of comparisons (e.g., a result of a comparison between a third distance metric and the aggregated distance metric) being utilized to determine to control the vehicle 606 to wait. Stop lines not being determined for the candidate trajectories 802(*iii*) and 802(*iv*) can be based on corresponding results of comparisons being utilized to determine to refrain from controlling the vehicle 606 to wait. Stop lines (e.g., the stop lines 804(1) and 804(2)) can be determined for the corresponding candidate trajectories 802(*i*) and 802(*ii*), but not for the candidate trajectories 802(*iii*) and 802(*iv*), based on the candidate trajectories 802(*i*) and 802(*ii*) leaving less space for the object 610 to pass by the vehicle 606, than for the candidate trajectories 802(*iii*) and 802(*iv*).

Figure 9:
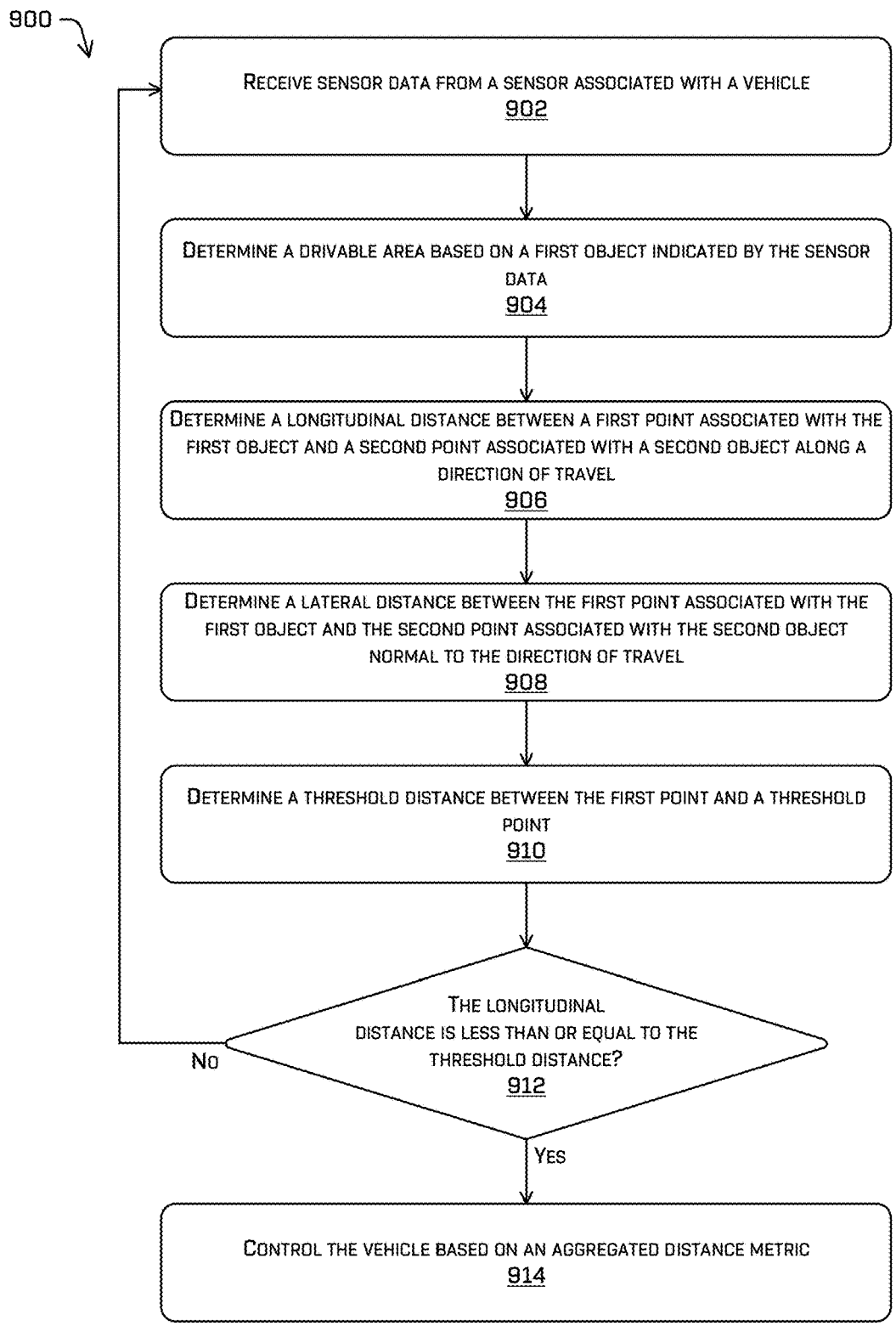
FIG. 9 depicts an example process for determining how to control a vehicle approaching an object that may potentially swerve into a lane of the vehicle.

FIG. 9 depicts an example process 900 for determining how to control a vehicle approaching an object that may potentially swerve into a lane of the vehicle.

At operation 902, the process 900 can include receiving sensor data from a sensor associated with a vehicle (e.g., the vehicle 606). The sensor data can be utilized to determine trajectories 702 to determine safe operation of the vehicle 606 throughout the environment At operation 904, the process 900 can include determining a drivable area (e.g., the drivable area 612) based on a first object (e.g., the object 608) indicated by the sensor data. The sensor data can be utilized to determine the non-drivable area 614 based on the object 608.

At operation 906, the process 900 can include determining a longitudinal distance (e.g., the distance 706) between a first point associated with the first object (e.g., the object 608) and a second point associated with a second object (e.g., the object 610) along a direction of travel associated with a drivable area (e.g., drivable surface). A first distance metric representing the distance 706 can be determined. The first point associated with the object 608 can be associated with a corner of a portion of the non-drivable area 614 that is nearest the object 610. The second point associated with the object 610 can be associated with a corner of the object 610 that is nearest the object 608. In some examples, the longitudinal distance 706 can be interpreted as the longitudinal portion (e.g., component) of a distance between the second point and an intersection point (e.g., a first intersection point at a first intersection between a line extending laterally from the first point and a line extending longitudinally from the second point).

At operation 908, the process 900 can include determining a lateral distance (e.g., the distance 708) between the first point associated with the first object (e.g., the object 608) and the second point associated with the second object (e.g., the object 610) normal to the direction of travel. A second distance metric representing the distance 708 can be determined. In some examples, the lateral distance 708 can be interpreted as the lateral portion (e.g., component) of a distance between the second point and an intersection point (e.g., a second intersection point at a second intersection between a line extending longitudinally from the first point and a line extending laterally from the second point).

At operation 910, the process 900 can include determining a threshold distance between the first point and a threshold point.

At operation 912, the process 900 can include determining whether the longitudinal distance is less than or equal to the threshold distance. The example process 900 can proceed to operation 902, based on determining the longitudinal distance metric exceeds the threshold distance. The example process 900 can proceed to operation 914, based on determining the longitudinal distance is less than or equal to the threshold distance.

At operation 914, the process 900 can include controlling the vehicle (e.g., the vehicle 606) based on an aggregated distance metric. A candidate trajectory for the vehicle 606 can be received. A third distance metric representing a second threshold distance between the first point associated with the first object and a third point associated with the candidate trajectory can be determined. The third distance metric (e.g., the second threshold distance) can be compared to an aggregated distance metric, which can include the lateral distance, a width of the object 610, and a buffer distance. Triggering of determining of a stop line (e.g., the stop line 718) can be based on the second threshold distance being less than the aggregated distance metric.

EXAMPLE CLAUSES

A: A system comprising: one or more processors: and one or more computer-readable media storing instructions executable bfy the one or more processors, wherein the instructions, when executed, cause the system to perform operations comprising: receiving sensor data from a sensor associated with a vehicle: determining, based at least in part on the sensor data, a first object in an environment: determining that the first object is stationary: determining, based at least in part on the sensor data and the first object, a drivable area in the environment: determining, based at least in part on the sensor data, a second object in the environment: determining, based at least in part on a trajectory and the drivable area, a distance metric that is a distance between the trajectory and the drivable area associated with the first object; determining a probability that the second object will intersect a drive path associated with the vehicle: and controlling the vehicle based at least in part on the distance metric and the probability.

B: The system of paragraph A, wherein the distance metric is a first distance metric, the operations further comprising: determining a stop line associated with the vehicle based at least in part on the first distance metric being less than a second distance metric, the second distance metric being based at least in part on a sum of a width of the second object and a buffer width.

C: The system of paragraph A or B, wherein determining the probability that the second object will intersect a drive path comprises at least one of: determining that a first portion of the first object is further from the vehicle than a second portion of the second object: or determining that a distance between the second object and the trajectory is less than a threshold distance.

D: The system of any of paragraphs A-C, the operations further comprising: determining a buffer based at least in part on motion data associated with the second object: determining, based at least in part on the probability and the buffer, to yield to the second object: determining, based at least in part on determining to yield, a width of the second object, and the buffer, a stop line: and controlling the vehicle to stop at the stop line.

E: The system of any of paragraphs A-D, further comprising: determining a motion of the first object based at least in part on sensor data: and determining the first object is stationary based on the motion being less than a threshold motion.

F: A method comprising: receiving sensor data from a sensor associated with a vehicle: determining, based at least in part on the sensor data, a first object in an environment: determining, based at least in part on the sensor data and the first object, a drivable area in the environment: determining, based on the sensor data, a second object in the environment: determining a plurality of trajectories for controlling the vehicle: determining a likelihood that the second object will intersect a trajectory of the plurality of trajectories: determining a distance metric associated with the drivable area and the trajectory: and controlling the vehicle based at least in part on the likelihood and the distance metric.

G: The method of paragraph F, wherein the distance metric is a first distance metric, the method further comprising: determining a stop line associated with the vehicle based at least in part on the first distance metric being less than a second distance metric, the second distance metric being based at least in part on a sum of a width of the second object and a buffer width.

H: The method of paragraph F or G, wherein determining the likelihood that the second object will intersect the trajectory further comprises at least one of: determining that a first portion of the first object is further from the vehicle than a second portion of the second object: or determining that a distance between the second object and the trajectory is less than a threshold distance.

I: The method of any of paragraphs F-H, further comprising: determining a buffer based at least in part on motion data associated with the second object; determining, based at least in part on the likelihood and the buffer, to yield to the second object: determining, based at least in part on determining to yield, a width of the second object, and the buffer, a stop line: and controlling the vehicle to stop at the stop line.

J: The method of any of paragraphs F-I, further comprising: determining a motion of the first object based at least in part on sensor data: and determining the first object is stationary based on the motion being less than a threshold motion.

K: The method of any of paragraphs F-J, further comprising: determining a stopping location based at least in part on a width of the second object and a buffer that is an additional distance: and causing the vehicle to stop at the stopping location.

L: The method of paragraph K, wherein determining the stopping location is based at least in part on at least one of a safety determination, a reference trajectory determined for the vehicle, or kinematics of the second object.

M: The method of any of paragraphs F-L, further comprising: determining the likelihood based at least in part on a first portion of the first object located relative to a second portion of the second object.

N: The method of any of paragraphs F-M, wherein determining the likelihood is further based at least in part on an attribute of the second object, the attribute comprising one or more of: a lighting signal indicator, a velocity, or a lane change.

O: The method of any of paragraphs F-N, where the drivable area is determined based at least in part on map data.

P: The method of any of paragraphs F-O, further comprising: determining, via a machine learned model, a confidence level associated with the first object being a stationary object: and determining, based on the confidence level, that the first object is stationary.

Q: The method of any of paragraphs F-P, further comprising: determining, based at least in part on the first object and the drivable area, a first non-drivable area in the environment: and determining, based at least in part on a third object in the environment and the drivable area, a second non-drivable area in the environment; fusing, as a fused non-drivable area, the first non-drivable area and the second non-drivable area: and determining a stop line based at least in part on the fused non-drivable area.

R: One or more non-transitory computer-readable media storing instructions that, when executed, cause one or more processors to perform operations comprising: receiving sensor data from a sensor associated with a vehicle: determining, based at least in part on the sensor data, a first object in an environment: determining that the first object is stationary: determining, based at least in part on the sensor data and the first object, a drivable area in the environment: determining, based on the sensor data, that a second object is in the environment: determining a plurality of trajectories for controlling the vehicle: determining a likelihood that the second object will intersect a trajectory of the plurality of trajectories: determining, based on the trajectory and the drivable area, a first distance metric that is a distance between the trajectory and a side of the drivable area associated with the first object: determining a second distance metric of the second object in the environment: and controlling the vehicle based at least in part on the likelihood, the first distance metric, and the second distance metric.

S: The one or more non-transitory computer-readable media of paragraph R, the operations further comprising: determining the first object is an obstruction based at least in part on a speed associated with the first object being less than threshold speed.

T: The one or more non-transitory computer-readable media of paragraph R or S, wherein determining the likelihood that the second object will intersect the trajectory further comprises at least one of: determining that a first portion of the first object is further from the vehicle than a second portion of the second object: or determining that a distance between the second object and the trajectory is less than a threshold distance.

U: A system comprising: one or more processors: and one or more computer-readable media storing instructions executable by the one or more processors, wherein the instructions, when executed, cause the system to perform operations comprising: receiving sensor data from a sensor associated with a vehicle: determining, based at least in part on the sensor data, that a first object in an environment is stationary: determining, based at least in part on the first object, a drivable area for the vehicle to traverse: determining a longitudinal distance between a first point associated with the first object and a second point associated with a second object along a direction of travel associated with the drivable area: determining a lateral distance between the first point associated with the first object and the second point associated with the second object normal to the direction of travel: determining a threshold distance between the first point associated with the first object and a threshold point: determining that the longitudinal distance is less than or equal to the threshold distance: determining, based at least in part on the longitudinal distance being less than or equal to the threshold distance, an aggregated distance metric comprising the lateral distance, a width of the second object, and a buffer distance: and controlling the vehicle based at least in part on the aggregated distance metric.

V: The system of paragraph U, wherein controlling the vehicle comprises: receiving a candidate trajectory for the vehicle: determining a second threshold distance between the first point associated with the first object and a third point associated with the candidate trajectory: and causing the vehicle to stop, based at least in part on the second threshold distance being less than the aggregated distance metric.

W: The system of paragraph U or V, wherein controlling the vehicle further comprises causing the vehicle to stop for a threshold amount of time.

X: The system of any of paragraphs U-W, wherein the instructions, when executed, further cause the system to perform further operations comprising: determining a cost based at least in part on a candidate trajectory and a stop line: and controlling the vehicle based at least in part on the cost.

Y: The system of any of paragraphs U-X, wherein the instructions, when executed, further cause the system to perform further operations comprising: receiving a plurality of candidate trajectories: and determining for a trajectory of the candidate trajectories a stop line, wherein controlling the vehicle comprises controlling the vehicle to stop at the stop line.

Z: One or more non transitory computer readable media storing instructions executable by one or more processors, wherein the instructions, when executed, cause the one or more processors to perform operations comprising: receiving sensor data from a sensor associated with a vehicle: determining a drivable area based at least in part on a first object represented in the sensor data: determining a first distance along a direction of travel associated with the drivable area between a first point associated with the first object and a second point associated with a second object: determining a second distance normal to the direction of travel between the first point associated with the first object and the second point associated with the second object: and controlling the vehicle based at least in part on the first distance and the second distance.

AA: The one or more non transitory computer readable media of paragraph Z, wherein the first distance is less than or equal to a threshold distance between the first point associated with the first object and a threshold point, and wherein controlling the vehicle comprises causing the vehicle to stop.

AB: The one or more non transitory computer readable media of paragraph Z or AA, the operations further comprising: determining a third distance normal to the direction of travel between the first point and a third point associated with a candidate trajectory for the vehicle to follow, wherein controlling the vehicle is further based at least in part on the third distance being less than a sum of the second distance, a width of the second object, and a buffer distance.

AC: The one or more non transitory computer readable media of any of paragraphs Z-AB, wherein controlling the vehicle comprises: causing the vehicle to stop, based at least in part on a threshold distance being less than an aggregated distance metric, the aggregated distance metric comprising the second distance, a width of the second object, and a buffer distance.

AD: The one or more non transitory computer readable media of any of paragraphs Z-AC, wherein controlling the vehicle further comprises causing the vehicle to stop for a threshold amount of time.

AE: The one or more non transitory computer readable media of any of paragraphs Z-AD, wherein controlling the vehicle further comprises causing the vehicle to move after waiting for a threshold amount of time, based at least in part on hysteresis information.

AF: The one or more non transitory computer readable media of any of paragraphs Z-AE, the operations further comprising: receiving a plurality of candidate trajectories: and determining for a trajectory of the candidate trajectories a stop line, wherein controlling the vehicle comprises controlling the vehicle to stop at the stop line.

AG: A method comprising: receiving sensor data from a sensor associated with a vehicle: determining a drivable area based at least in part on a first object indicated by the sensor data: determining a first distance along a direction of travel associated with the drivable area between a first point associated with the first object and a second point associated with a second object: determining a second distance normal to the direction of travel between the first point associated with the first object and the second point associated with the second object: and controlling the vehicle based at least in part on the first distance and the second distance.

AH: The method of paragraph AG, wherein the first distance is less than or equal to a threshold distance between the first point associated with the first object and a threshold point, and wherein controlling the vehicle comprises causing the vehicle to stop.

AI: The method of paragraph AG or AH, further comprising: determining a third distance normal to the direction of travel between the first point and a third point associated with a candidate trajectory for the vehicle to follow, wherein controlling the vehicle is further based at least in part on the third distance being less than a sum of the second distance, a width of the second object, and a buffer distance.

AJ: The method of any of paragraphs AG-AI, wherein controlling the vehicle comprises: causing the vehicle to stop, based at least in part on a threshold distance being less than an aggregated distance metric, the aggregated distance metric comprising the second distance, a width of the second object, and a buffer distance.

AK: The method of any of paragraphs AG-AJ, wherein controlling the vehicle further comprises causing the vehicle to stop for a threshold amount of time.

AL: The method of any of paragraphs AG-AK, wherein controlling the vehicle further comprises causing the vehicle to move after waiting for a threshold amount of time, based at least in part on hysteresis information.

AM: The method of any of paragraphs AG-AL, further comprising:
receiving a plurality of candidate trajectories: and determining for a trajectory of the candidate trajectories a stop line, wherein controlling the vehicle comprises controlling the vehicle to stop at the stop line.

AN: The method of any of paragraphs AG-AM, further comprising: determining a first cost based at least in part on a first candidate trajectory and a first stop line, the first stop line being determined based at least in part on the second distance and a first threshold distance, the first threshold distance determined based on the first point and a third point associated with the first candidate trajectory: determining a second threshold distance between the first point and a fourth point associated with a second candidate trajectory: determining a second cost based at least in part on the second candidate trajectory and a second stop line, the second stop line being determined based at least in part on the second distance and the second threshold distance: determining the first stop line or the second stop line as a determined stop line, based at least in part on a lowest cost trajectory between the first candidate trajectory and the second candidate trajectory: and controlling the vehicle based at least in part on the determined stop line.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
receiving sensor data from a sensor associated with a vehicle;
determining, based at least in part on the sensor data, that a first object in an environment is stationary;
determining, based at least in part on the first object, a drivable area for the vehicle to traverse;
determining a longitudinal distance between a first point associated with the first object and a second point associated with a second object along a direction of travel associated with the drivable area;
determining a lateral distance between the first point associated with the first object and the second point associated with the second object normal to the direction of travel;
determining a threshold distance between the first point associated with the first object and a threshold point;
determining that the longitudinal distance is less than or equal to the threshold distance;
determining, based at least in part on the longitudinal distance being less than or equal to the threshold distance, an aggregated distance metric comprising the lateral distance, a width of the second object, and a buffer distance; and
controlling the vehicle based at least in part on the aggregated distance metric.

2. The system of claim 1, wherein controlling the vehicle comprises:
receiving a candidate trajectory for the vehicle;
determining a second threshold distance between the first point associated with the first object and a third point associated with the candidate trajectory; and causing the vehicle to stop, based at least in part on the second threshold distance being less than the aggregated distance metric.

3. The system of claim 2, wherein controlling the vehicle further comprises causing the vehicle to stop for a threshold amount of time.

4. The system of claim 1, wherein the instructions, when executed, further cause the system to perform further operations comprising:
  determining a cost based at least in part on a candidate trajectory and a stop line; and
  controlling the vehicle based at least in part on the cost.

5. The system of claim 1, wherein the instructions, when executed, further cause the system to perform further operations comprising:
  receiving a plurality of candidate trajectories; and
  determining for a trajectory of the candidate trajectories a stop line,
  wherein controlling the vehicle comprises controlling the vehicle to stop at the stop line.

6. One or more non-transitory computer-readable media storing instructions executable by one or more processors, wherein the instructions, when executed, cause the one or more processors to perform operations comprising:
  receiving sensor data from a sensor associated with a vehicle:
  determining a drivable area based at least in part on a first object represented in the sensor data;
  determining a first distance along a direction of travel associated with the drivable area between a first point associated with the first object and a second point associated with a second object;
  determining a second distance normal to the direction of travel between the first point associated with the first object and the second point associated with the second object; and
  controlling the vehicle based at least in part on the first distance and the second distance.

7. The one or more non-transitory computer-readable media of claim 6, wherein the first distance is less than or equal to a threshold distance between the first point associated with the first object and a threshold point, and
  wherein controlling the vehicle comprises causing the vehicle to stop.

8. The one or more non-transitory computer-readable media of claim 6, the operations further comprising:
  determining a third distance normal to the direction of travel between the first point and a third point associated with a candidate trajectory for the vehicle to follow,
  wherein controlling the vehicle is further based at least in part on the third distance being less than a sum of the second distance, a width of the second object, and a buffer distance.

9. The one or more non-transitory computer-readable media of claim 6, wherein controlling the vehicle comprises:
  causing the vehicle to stop, based at least in part on a threshold distance being less than an aggregated distance metric, the aggregated distance metric comprising the second distance, a width of the second object, and a buffer distance.

10. The one or more non-transitory computer-readable media of claim 6, wherein controlling the vehicle further comprises causing the vehicle to stop for a threshold amount of time.

11. The one or more non-transitory computer-readable media of claim 6, wherein controlling the vehicle further comprises causing the vehicle to move after waiting for a threshold amount of time, based at least in part on hysteresis information.

12. The one or more non-transitory computer-readable media of claim 6, the operations further comprising:
  receiving a plurality of candidate trajectories; and
  determining for a trajectory of the candidate trajectories a stop line, wherein controlling the vehicle comprises controlling the vehicle to stop at the stop line.

13. A method comprising:
  receiving sensor data from a sensor associated with a vehicle;
  determining a drivable area based at least in part on a first object indicated by the sensor data;
  determining a first distance along a direction of travel associated with the drivable area between a first point associated with the first object and a second point associated with a second object;
  determining a second distance normal to the direction of travel between the first point associated with the first object and the second point associated with the second object; and
  controlling the vehicle based at least in part on the first distance and the second distance.

14. The method of claim 13, wherein the first distance is less than or equal to a threshold distance between the first point associated with the first object and a threshold point, and
  wherein controlling the vehicle comprises causing the vehicle to stop.

15. The method of claim 13, further comprising:
  determining a third distance normal to the direction of travel between the first point and a third point associated with a candidate trajectory for the vehicle to follow,
  wherein controlling the vehicle is further based at least in part on the third distance being less than a sum of the second distance, a width of the second object, and a buffer distance.

16. The method of claim 13, wherein controlling the vehicle comprises:
  causing the vehicle to stop, based at least in part on a threshold distance being less than an aggregated distance metric, the aggregated distance metric comprising the second distance, a width of the second object, and a buffer distance.

17. The method of claim 13, wherein controlling the vehicle further comprises causing the vehicle to stop for a threshold amount of time.

18. The method of claim 13, wherein controlling the vehicle further comprises causing the vehicle to move after waiting for a threshold amount of time, based at least in part on hysteresis information.

19. The method of claim 13, further comprising:
  receiving a plurality of candidate trajectories; and
  determining for a trajectory of the candidate trajectories a stop line, wherein controlling the vehicle comprises controlling the vehicle to stop at the stop line.

20. The method of claim 13, further comprising:
  determining a first cost based at least in part on a first candidate trajectory and a first stop line, the first stop line being determined based at least in part on the second distance and a first threshold distance, the first threshold distance determined based on the first point and a third point associated with the first candidate trajectory;

determining a second threshold distance between the first point and a fourth point associated with a second candidate trajectory;

determining a second cost based at least in part on the second candidate trajectory and a second stop line, the second stop line being determined based at least in part on the second distance and the second threshold distance;

determining the first stop line or the second stop line as a determined stop line, based at least in part on a lowest cost trajectory between the first candidate trajectory and the second candidate trajectory; and controlling the vehicle based at least in part on the determined stop line.

* * * * *